United States Patent
Iida

(10) Patent No.: US 10,218,056 B2
(45) Date of Patent: Feb. 26, 2019

(54) WIRELESS COMMUNICATION DEVICE AND WIRELESS COMMUNICATION SYSTEM

(71) Applicant: SONY CORPORATION, Tokyo (JP)

(72) Inventor: Sachio Iida, Chiba (JP)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 15/302,624

(22) PCT Filed: Apr. 10, 2015

(86) PCT No.: PCT/JP2015/061189
§ 371 (c)(1),
(2) Date: Oct. 7, 2016

(87) PCT Pub. No.: WO2015/159808
PCT Pub. Date: Oct. 22, 2015

(65) Prior Publication Data
US 2017/0062910 A1    Mar. 2, 2017

(30) Foreign Application Priority Data

Apr. 17, 2014 (JP) .................................. 2014-085145

(51) Int. Cl.
*H01Q 1/24* (2006.01)
*H01Q 13/08* (2006.01)
(Continued)

(52) U.S. Cl.
CPC ........... *H01Q 1/243* (2013.01); *H01Q 1/2291* (2013.01); *H01Q 3/36* (2013.01); *H01Q 13/08* (2013.01);
(Continued)

(58) Field of Classification Search
CPC ........ H01Q 1/243; H01Q 1/2291; H01Q 3/36; H01Q 13/08; H01Q 21/20; H01Q 21/205;
(Continued)

(56) References Cited

U.S. PATENT DOCUMENTS 7,352,325 B1 * 4/2008 Floyd ....................... H01Q 3/30
342/372
2005/0259914 A1 * 11/2005 Padgett ................... H01Q 21/26
385/16

(Continued)

FOREIGN PATENT DOCUMENTS

EP    2639993 A    9/2013
EP    2639993 A2   9/2013
(Continued)

OTHER PUBLICATIONS

Qiang Bai et al., "Generation of Orbital Angular Momentum (OAM) Radio Beams with Phased Patch Array", 2013 Loughborough Antennas & Propagation Conference, Nov. 11-12, 2013, Loughborough, UK, 4 pages.

(Continued)

Primary Examiner — Dieu Hien T Duong
Assistant Examiner — Bamidele A Jegede
(74) Attorney, Agent, or Firm — Xsensus LLP

(57) ABSTRACT

There is provided an excellent wireless communication device that can suitably perform short range communication by using a millimeter wave.

Described are a method of generating a whirl of waves and its characteristic of attenuation proportional to a fourth power of a distance when the waves are in a state L=0 or L=±2. Accordingly, instead of an electric field induction antenna that cannot be used in the millimeter wave band, an initiator and a responder are both equipped with an array antenna generating the whirl of waves to perform commu- (Continued)

nication by using the whirl of waves in the state characteristically attenuating in proportion to the fourth power of the distance, so that the party at the other end approaching can easily be detected while at the same time properly restricting a communication area and preventing improper connection.

14 Claims, 25 Drawing Sheets

(51) Int. Cl.
  *H01Q 21/20* (2006.01)
  *H04B 1/59* (2006.01)
  *H04B 5/00* (2006.01)
  *H01Q 1/22* (2006.01)
  *H01Q 3/36* (2006.01)
  *H04B 7/06* (2006.01)

(52) U.S. Cl.
  CPC .......... *H01Q 21/20* (2013.01); *H01Q 21/205* (2013.01); *H04B 1/59* (2013.01); *H04B 5/0031* (2013.01); *H04B 7/0617* (2013.01)

(58) Field of Classification Search
  CPC .......... H01Q 1/24; H04B 1/59; H04B 5/0031; H04B 7/0617
  See application file for complete search history.

(56) References Cited

U.S. PATENT DOCUMENTS

| | | | | |
|---|---|---|---|---|
| 2007/0290939 A1* | 12/2007 | Teshirogi | ................ | H01Q 1/38 343/795 |
| 2010/0013696 A1* | 1/2010 | Schmitt | ................ | G01S 7/024 342/54 |
| 2010/0046325 A1* | 2/2010 | Martin | ................ | G01S 15/104 367/87 |
| 2010/0066590 A1* | 3/2010 | Brown | ................ | G01S 7/03 342/147 |
| 2013/0235885 A1* | 9/2013 | Chen | ................ | H04L 5/0044 370/468 |
| 2015/0146815 A1* | 5/2015 | Berretta | ................ | H04L 5/04 375/279 |
| 2015/0372398 A1* | 12/2015 | Dudorov | ................ | H01Q 25/008 342/368 |

FOREIGN PATENT DOCUMENTS

| | | | | | |
|---|---|---|---|---|---|
| GB | 2410130 | A | * | 1/2004 | ............ H01Q 21/20 |
| JP | 53-008546 | A | | 1/1978 | |
| JP | 60-206207 | A | | 10/1985 | |
| JP | 07-288417 | A | | 10/1995 | |
| JP | 08-181539 | A | | 7/1996 | |
| JP | 2004-088325 | A | | 3/2004 | |
| JP | 2004088325 | A | * | 3/2004 | ............ H01Q 21/20 |
| JP | 2004-088325 | A | | 3/2007 | |
| JP | 43-45849 | B2 | | 10/2009 | |
| JP | 4345849 | B | | 10/2009 | |
| JP | 47-88562 | B2 | | 10/2011 | |
| JP | 4788562 | B | | 10/2011 | |
| JP | 2012-169779 | A | | 6/2012 | |
| JP | 2012-169779 | A | | 9/2012 | |
| WO | WO2012175629 | A1 | * | 12/2012 | ............ H01Q 21/20 |

OTHER PUBLICATIONS

Siavoush M. Mohammadi et al., "Orbital angular momentum in radio—a system study", IEEE Transactions on Antennas and Propagation, vol. 58, Issue: 2, Feb. 2010, 7 pages.
Ove Edfors et al.,"Is Orbital Angular Momentum (GAM) Based Radio Communication an Unexploited Area?", IEEE Transactions on Antennas and Propagation, vol. 60, No. 2, Feb. 2012, 6 pages.
Bai, et al.,"Generation of Orbital Angular Momentum (OAM) Radio Beams with Phased Patch Array", Loughborough Antennas & Propagation Conference, Nov. 11-12, 2013, pp. 410-413.
Mohammadi, et al.,"Orbital Angular Momentum in Radio—A System Study", IEEE Transactions on Antennas and Propagation, pp. 1-7.
Edfors, et al.,"Is Orbital Angular Momentum (OAM) Based Radio Communication an Unexploited Area?", IEEE Transactions on Antennas and Propagation, vol. 60, No. 2, Feb. 2012, pp. 1126-1131.

* cited by examiner

OAM   L=2

WIRELESS COMMUNICATION DEVICE AND WIRELESS COMMUNICATION SYSTEM

CROSS REFERENCE TO RELATED APPLICATIONS

This application is a U.S. National Phase of International Patent Application No. PCT/JP2015/061189 filed on Apr. 10, 2015, which claims priority benefit of Japanese Patent Application No. JP 2014-085145 filed in the Japan Patent Office on Apr. 17, 2014. Each of the above-referenced applications is hereby incorporated herein by reference in its entirety.

TECHNICAL FIELD

The technology disclosed in the present description relates to a wireless communication device and a wireless communication system performing short range wireless communication by primarily using a millimeter wave.

BACKGROUND ART

The short range wireless communication performing non-contact wireless communication at close range of about several centimeters is employed in electronic commuter passes and electronic money, for example. Mobile phones equipped with the electronic commuter pass and electronic money functions using the short range wireless communication are also becoming widespread. The short range wireless communication is standardized in ISO/IEC 14443 and ISO/IEC 18092 (hereinafter also referred to as an NFC (Near Field Communication)), for example.

The short range wireless communication performed at a higher transmission rate than the NFC is becoming popular as well. TransferJet (registered trademark) is a communication scheme of such high-speed, short range wireless communication, for example. TransferJet (registered trademark) is the short range wireless communication scheme using an ultra wide band (UWB) (refer to Patent Document 1, for example), and is standardized in ISO/IEC 17568 and ISO/IEC 17569. TransferJet (registered trademark) adopts a carrier of 4.48 GHz and performs the short range wireless communication at the transmission rate of 560 Mbps maximum.

The short range wireless communication scheme like TransferJet (registered trademark) enables high-speed data transfer among devices such as a digital camera, a personal computer (PC) and a printer (refer to Patent Document 2, for example). A short range wireless communication system employing such short range wireless communication scheme uses an antenna based on electric field induction to facilitate detection of only the party at the other end present nearby as well as deliberately limit the communication range to the close range of several centimeters and ensure security for the range, whereby complicated security setting is not required while at the same time improving usability (moderate feel of a touch operation) for a user, the antenna providing attenuation of radio waves emitted therefrom in proportion to the fourth power of the distance.

Moreover, there has been an attempt in recent years to perform faster data transfer by using a wide range of frequencies in a millimeter wave band. Radio waves attenuate in proportion to the square of the frequency, so that the low-gain antenna based on the electric field induction cannot be used for the high-frequency millimeter wave. It is thus considered appropriate for radio wave communication using the millimeter wave to use a normal antenna with which the radiated waves attenuate in proportion to the square of the distance.

SUMMARY OF THE INVENTION

Problems to be Solved by the Invention

An object of the technology disclosed in the present description is to provide excellent wireless communication device and wireless communication system that can suitably perform the short range wireless communication by using the millimeter wave.

Solutions to Problems

The present application has been made in consideration of the aforementioned problems, where a technology described in claim 1 is a wireless communication device including:

an antenna unit that transmits and receives a whirl of waves; and a setting unit that sets a state of the whirl of waves transmitted and received by the antenna unit.

According to a technology described in claim 2 of the present application, the setting unit of the wireless communication device of claim 1 is configured to set the antenna unit to a state in which the whirl of waves characteristically attenuates in proportion to a (2+K)-th power of a distance (where K>0).

According to a technology described in claim 3 of the present application, the antenna unit of the wireless communication device of claim 1 or 2 is formed of a circular array antenna in which each of a plurality of antenna elements is disposed at a regular interval along a circumference of a circle while facing a center of the circle. Moreover, the wireless communication device further includes a divider/combiner that divides a transmitted signal among the plurality of the antenna elements or combines a received signal of the plurality of the antenna elements.

According to a technology described in claim 4 of the present application, the setting unit of the wireless communication device of claim 3 includes a phase shifter that shifts a phase of the transmitted signal or the received signal of the plurality of the antenna elements according to an angle at which each antenna element is disposed.

According to a technology described in claim 5 of the present application, the antenna unit of the wireless communication device of any one of claims 1 to 4 is formed of a circular array antenna in which each of N antenna elements is disposed at a regular interval along a circumference of a circle while facing a center of the circle. In addition, at the time of transmission, the setting unit shifts a phase of a transmitted signal from an n-th antenna element by an excitation phase $\Phi_n$ expressed in expression (4) below to allow the antenna unit to transmit a whirl of waves in a desired OAM state L or, at the time of reception, shifts a phase of a received signal of the n-th antenna element by the phase $\Phi_n$ expressed in expression (4) below to allow the antenna unit to receive a whirl of waves in a desired OAM state L.

According to a technology described in claim 6 of the present application, the divider/combiner of the wireless communication device of claim 3 divides the transmitted signal among the plurality of the antenna elements equally in phase or combines the received signal of the plurality of the antenna elements equally in phase.

According to a technology described in claim 7 of the present application, the antenna unit of the wireless communication device of any one of claims 1 to 3 includes a first circular array antenna in which each of a plurality of antenna elements for transmission is disposed at a regular interval along a circumference of a circle while facing a center of the circle, and a second circular array antenna in which each of a plurality of antenna elements for reception is disposed at a regular interval along a circumference of a circle while facing a center of the circle, the first and second circular array antennas being provided separately.

According to a technology described in claim 8 of the present application, the first circular array antenna and the second circular array antenna of the wireless communication device of claim 7 are disposed on the circumferences of concentric circles.

According to a technology described in claim 9 of the present application, the wireless communication device of claim. 7 or 8 is configured such that the first circular array antenna is disposed on an inner side of the second circular array antenna.

According to a technology described in claim 10 of the preset application, each of the plurality of the antenna elements of the wireless communication device of any one of claims 3 to 9 is formed of a linearly polarized patch antenna.

According to a technology described in claim 11 of the preset application, each of the plurality of the antenna elements of the wireless communication device of any one of claims 3 to 9 is configured to transmit and receive a signal of a millimeter wave band.

According to a technology described in claim 12 of the present application, the antenna unit of the wireless communication device of claim 1 includes a transmission antenna and a reception antenna separately, and performs transmission by using the whirl of waves in a first state as well as receives the whirl of waves in a second state different from the first state.

Moreover, according to a technology described in claim 13 of the present application, a wireless communication device includes a plurality of communication branches each having an antenna unit that transmits and receives a whirl of waves, where the wireless communication device performs transmission and reception by using the whirl of waves in a state different for each communication branch.

According to a technology described in claim 14 of the present application, the setting unit of the wireless communication device of claim 1 sets the antenna unit to a state in which the whirl of waves characteristically attenuates in proportion to a (2+K)-th power of a distance at the time of searching for a device (where K>0) and, after a connection is established, sets the antenna unit to a state in which the whirl of waves characteristically attenuates in proportion to a square of the distance.

Moreover, according to a technology described herein a wireless communication system includes:

a first radio and a second radio each transmitting and receiving a whirl of waves, where the system performs transmission from the first radio to the second radio by using the whirl of waves in a first state and performs transmission from the second radio to the first radio by using the whirl of waves in a second state different from the first state.

Note that the "system" as referred herein is a logical assembly of a plurality of devices (or functional modules implementing a specific function), where the devices or functional modules may or may not be housed in a single housing (the same applies hereinafter).

Moreover, according to a technology described herein, a wireless communication system includes:

a transmitter that includes a plurality of transmission branches each having an antenna unit transmitting a whirl of waves and transmits the whirl of waves in a state different in each transmission branch; and a receiver that includes a plurality of reception branches each having an antenna unit receiving a whirl of waves and receives the whirl of waves in a state different in each reception branch.

Moreover, according to a technology described herein, a wireless communication system includes:

an initiator and a responder each transmitting and receiving a whirl of waves, where the initiator transmits a connection request on a regular basis by using the whirl of waves characteristically attenuating in proportion to a (2+K)-th power of a distance and waits for a response from the responder (where K>0), the responder performs reception intermittently to be on standby for the whirl of waves from the initiator and responds by sending a connection acceptance upon detecting an approach of the initiator, and, after a connection is established, the initiator and the responder perform data communication by switching an antenna unit to a state in which the whirl of waves characteristically attenuates in proportion to a square of the distance.

Effects of the Invention

According to the technology disclosed in the present description, there can be provided the excellent wireless communication device and wireless communication system that can suitably perform the short range wireless communication by using the millimeter wave.

According to the technology disclosed in the present description, the wireless communication devices operating as the initiator and the responder in the short range wireless communication using the millimeter wave are both equipped with the array antenna generating the whirl of waves. The wireless communication device thus performs communication by using the whirl of waves in the state characteristically attenuating in proportion to the fourth power of the distance, so that the approach of the party at the other end can be easily detected while at the same time properly restricting the communication area and preventing improper connection.

Note that the effect described in the present description is provided by way of example and not by way of limitation. Moreover, the present invention in some cases has an additional effect besides the aforementioned effects.

Other objects, features and advantages pertaining to the technology disclosed in the present description will become apparent by the more detailed description provided hereinafter in the embodiments and the accompanying drawings.

MODES FOR CARRYING OUT THE INVENTION

Figure 1A:
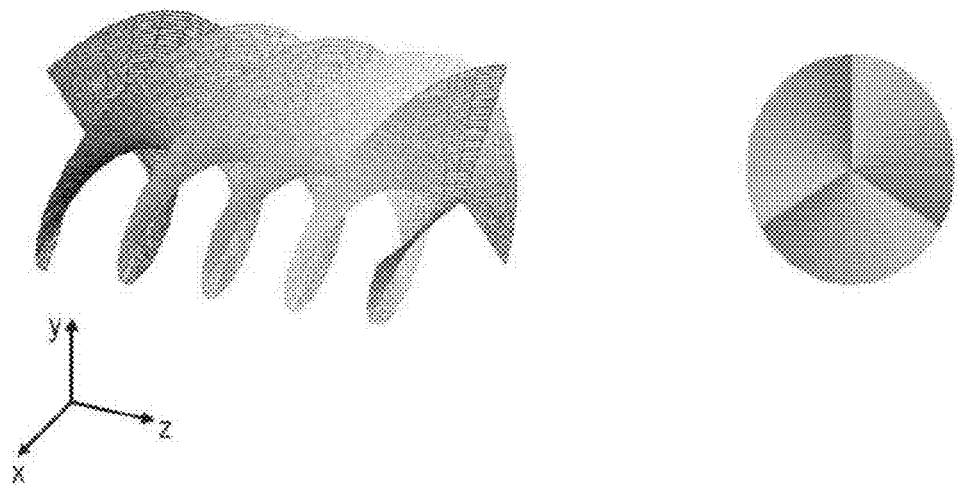
FIG. 1A is a diagram schematically illustrating rotation of a plane of polarization when an OAM state L=3.
Figure 1B:
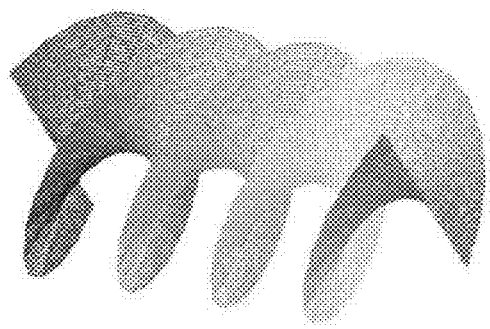
FIG. 1B is a diagram schematically illustrating rotation of the plane of polarization when the OAM state L=2.
Figure 1B:
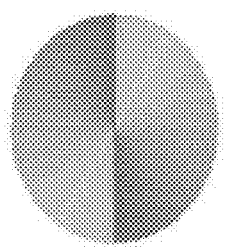
Figure 1B:
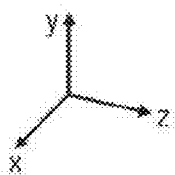
Figure 1C:
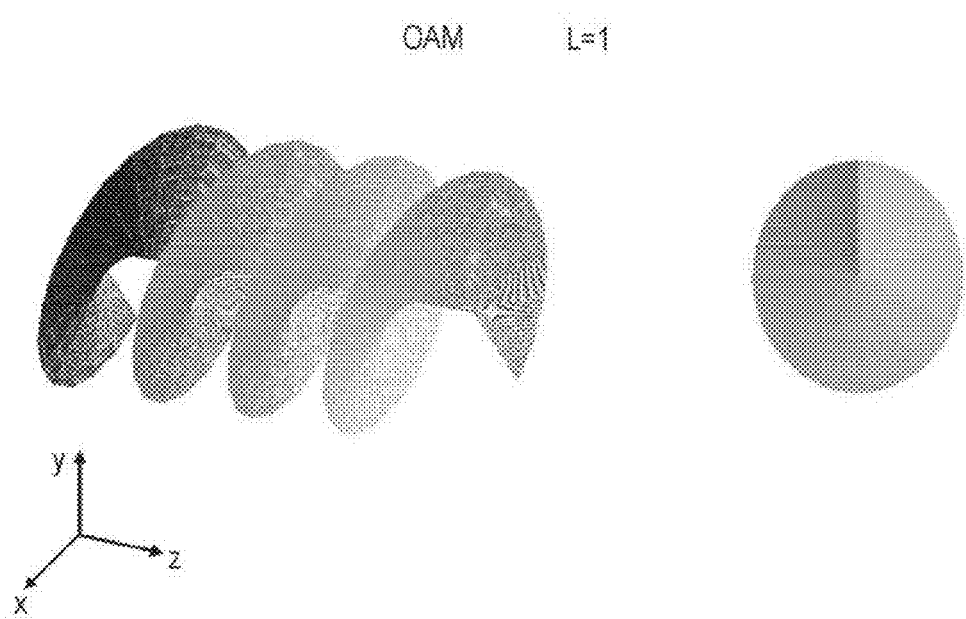
FIG. 1C is a diagram schematically illustrating rotation of the plane of polarization when the OAM state L=1.
Figure 1D:
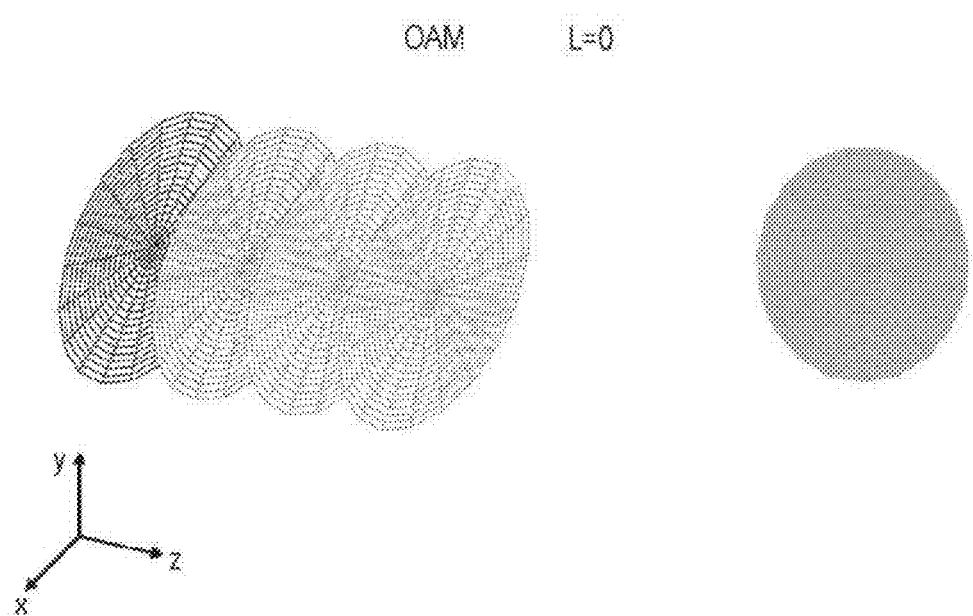
FIG. 1D is a diagram schematically illustrating rotation of the plane of polarization when the OAM state L=0.
Figure 1E:
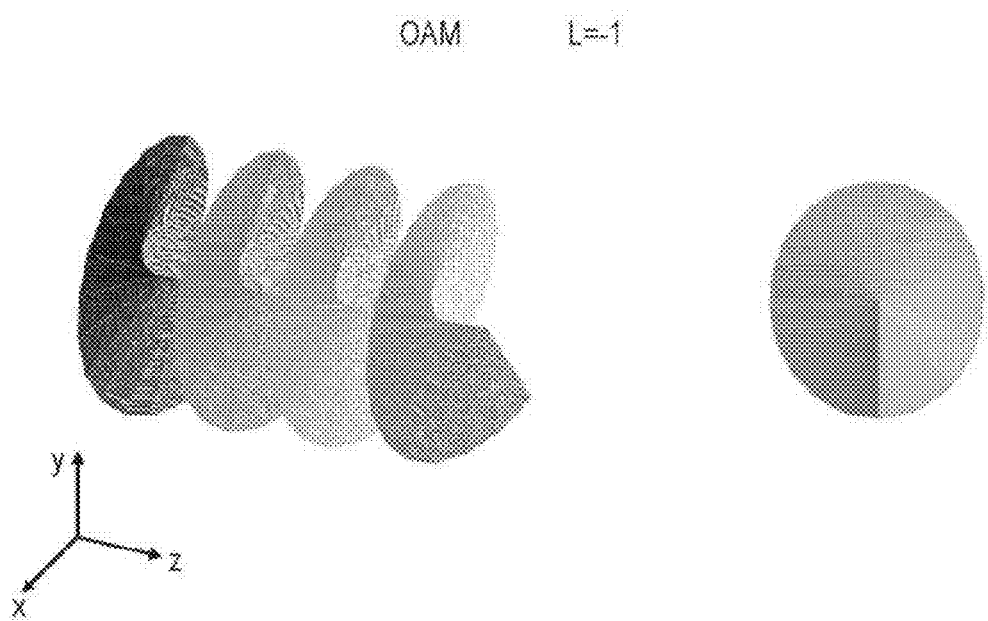
FIG. 1E is a diagram schematically illustrating rotation of the plane of polarization when the OAM state L=−1.
Figure 1F:
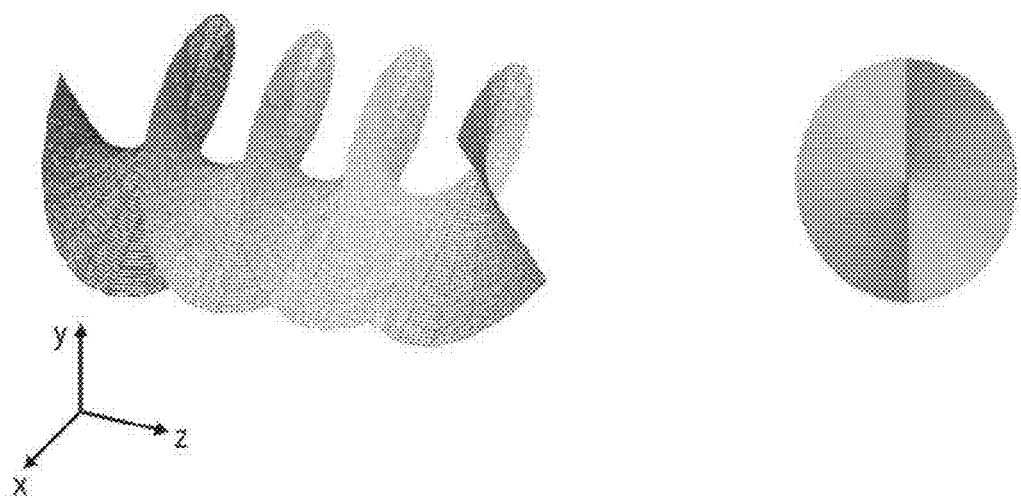
FIG. 1F is a diagram schematically illustrating rotation of the plane of polarization when the OAM state L=−2.
Figure 1G:
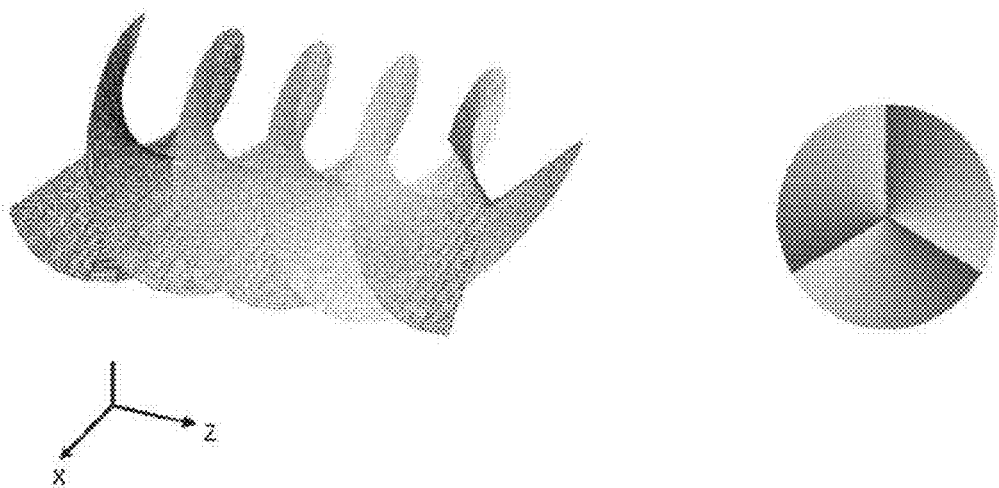
FIG. 1G is a diagram schematically illustrating rotation of the plane of polarization when the OAM state L=−3.

Embodiments of a technology disclosed in the present description will be hereinafter described in detail with reference to the drawings.

The short range wireless communication scheme using the UWB has been developed already (refer to Patent Document 1, for example) and in the process of being standardized by TransferJet (registered trademark) or the like, as described above. Now, there will be contemplated a short range wireless communication scheme capable of achieving faster data communication by using the millimeter wave instead of the UWB.

The short range wireless communication scheme using the UWB uses an antenna based on electric field induction with which radiated waves attenuate in proportion to the fourth power of the distance, so that security is ensured by deliberately limiting a communication range to a close range. In the short range wireless communication using the millimeter wave, on the other hand, the waves attenuate in proportion to the square of the frequency, so that the communication range becomes very narrow when the low-gain electric field induction antenna is used and that one cannot obtain a feel of a touch operation similar to the feel obtained with the short range wireless communication scheme using the UWB. Moreover, when one attempts to perform the short range wireless communication with the millimeter wave by using a normal antenna providing attenuation of the radiated waves in proportion to the square of the distance, a difference in the attenuation characteristic causes the waves to reach an area beyond a desired communication area. Concerning the short range wireless communication system using the millimeter wave, for example, there is proposed a wireless communication device which estimates a distance to the party at the other end by receiving a beacon signal from a device at the other end and establishes communication therewith only when it is determined that the own device and the device at the other end are within a communicable area on the basis of the positional relationship between the devices (refer to Patent Document 3, for example).

On the other hand, the present description proposes a technology in which the short range wireless communication using the millimeter wave is performed by a wireless communication device equipped with an array antenna generating a whirl of waves. When the wireless communication device adopting the technology disclosed in the present description is disposed in both an initiator and a responder, the device performs communication by using the whirl of waves in a state characteristically attenuating in proportion to the fourth power of the distance, for example, so that an approach of the party at the other end can easily be detected while at the same time properly restricting the communication area and preventing improper connection.

The whirl of waves will be described first. Light and waves can propagate in the form of a whirl, namely the whirl of waves, in which a plane of polarization is twisted in a spiral around an axis of rotation being a direction of propagation of the light and waves. The whirl of waves can have a plurality of states similar to an orbital angular momentum (OAM) of an electron in an intrinsic state. The state of the whirl of waves is assigned a state number L as follows to be identified.

[Mathematical Formula 1]

L=0 is a state with no whirl.

L=1 is a state with a phase delay of $2\pi$ per right-hand rotation.

L=−1 is a state with a phase delay of $2\pi$ per left-hand rotation.

L=2 is a state with a phase delay of $4\pi$ per right-hand rotation.

L=−2 is a state with a phase delay of $4\pi$ per left-hand rotation.

L=3 is a state with a phase delay of $6\pi$ per right-hand rotation.

L=−3 is a state with a phase delay of $6\pi$ per left-hand rotation.

The rest is omitted.

Each of FIGS. 1A to 1G is a diagram schematically illustrating rotation of the plane of polarization for each OAM state L. In each figure, a diagram on the left illustrates the plane of polarization with x and y directions corresponding to the direction of polarization of the waves and a z direction corresponding to the direction of travel of the waves, while a diagram on the right illustrates the plane of polarization as viewed along the z direction (or the direction of travel). As one can see from FIG. 1C, the plane of polarization when the OAM state L=1 is the same as that of a general right-hand circularly polarized (RHCP) wave. Moreover, as one can see from FIG. 1E, the plane of polarization when the OAM state L=−1 is the same as that of a general left-hand circularly polarized (LHCP) wave. The whirls of waves in different OAM states have the property of orthogonally intersecting each other.

The whirl of waves can be generated by using a phased array antenna disposed in a circle (refer to Non-Patent Documents 1 and 2, for example). In this industry, there is also known a circular array antenna in which a plurality of antennas is disposed along a circumference of a circle (refer to Patent Documents 4 and 5, for example). The whirl of waves can be generated by a sequential rotation technique in which the antennas facing the center of the circle are disposed at regular intervals along the circumference and excited in a phase corresponding to the angle of disposition of each antenna.

Figure 2:
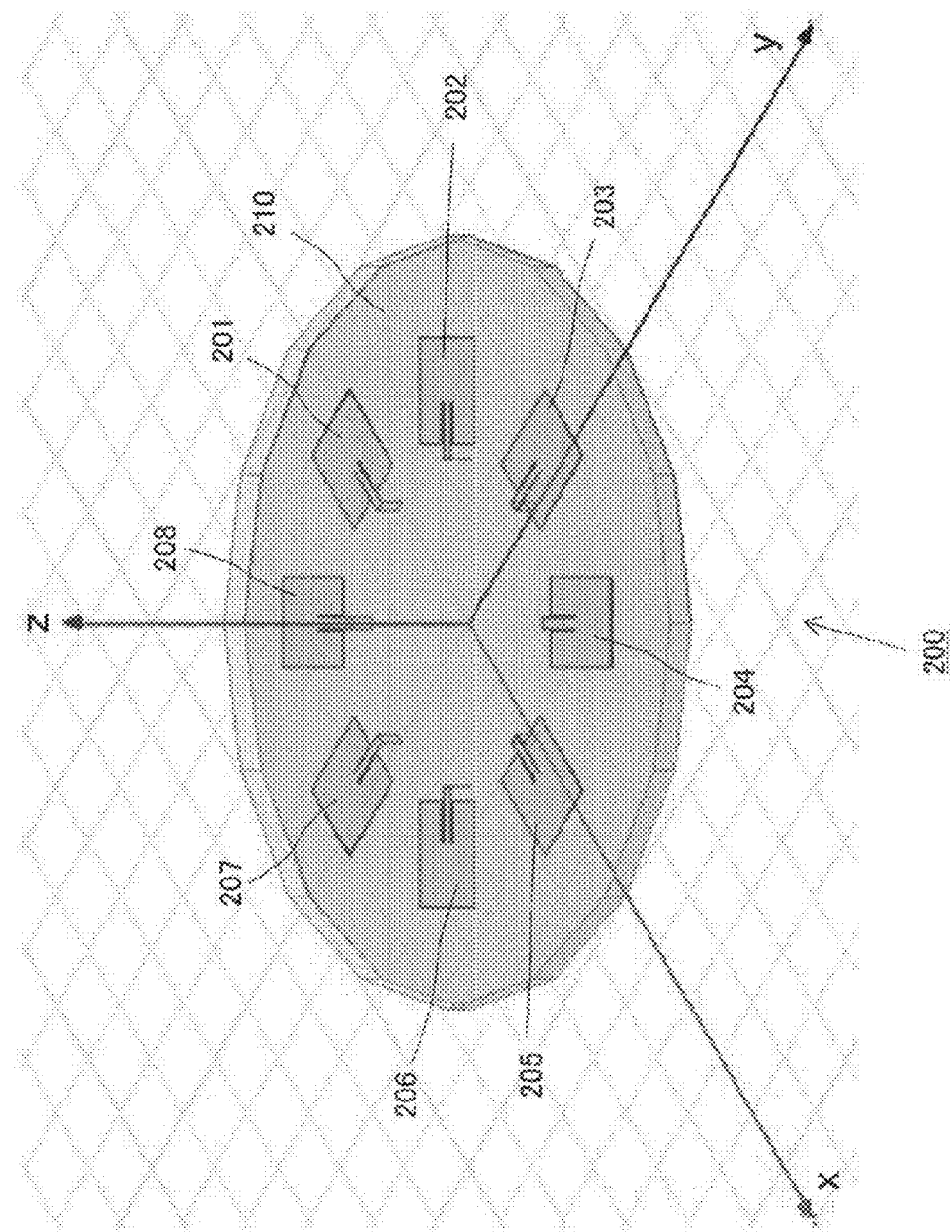
FIG. 2 is a diagram illustrating a circular array antenna 200 made by applying a sequential rotation technique.

FIG. 2 illustrates a circular array antenna 200 formed by applying the sequential rotation technique. The circular array antenna 200 illustrated in the figure is formed by disposing eight linearly polarized patch antennas 201 to 208 at regular intervals along a circumference of circle with a predetermined radius on a top surface of a double-sided printed circuit board 210 that is disposed on an x-y plane and includes a GND layer formed on a bottom surface of the board. Each of the patch antennas 201 to 208 making up the circular array antenna 200 is disposed such that a feeding unit of the antenna faces the center of the circle according to the sequential rotation technique. Each of the antennas 201 to 208 is then excited in a phase corresponding to the angle of disposition thereof to be able to generate the whirl of waves traveling in the z direction indicated in the figure. While a specific configuration of each of the linearly polarized patch antennas 201 to 208 will not be described, each antenna has a structure and dimensions to be able to transmit and receive a signal of a desired radio frequency band, namely the millimeter wave band.

Where N is the total number of the patch antennas included in the circular array antenna (N=8 in the example illustrated in FIG. 2), an n-th patch antenna (n is a positive integer smaller than or equal to N) is rotated by an angle $\varphi_r$, expressed in expression (2) with respect to a first patch antenna.

[Mathematical Formula 2]

$$\phi_n = \frac{2\pi(n-1)}{N} \quad (2)$$

The number of the OAM states L that can be generated by the N patch antennas falls within a range expressed in expression (3) below (refer to Non-Patent Document 2, for example).

[Mathematical Formula 3]

$$-N/2 < L < N/2 \quad (3)$$

When the total number of the patch antennas included in the circular array antenna is eight (N=8) as illustrated in FIG. 2, there can be generated seven OAM states including L=3, 2, 1, 0, −1, −2, and −3. Moreover, an excitation phase of the n-th patch antenna required to generate each OAM state L equals an angle $\Phi_n$ expressed in expression (4) with respect to an excitation phase of the first patch antenna.

[Mathematical Formula 4]

$$\Phi_n = \frac{2\pi L(n-1)}{N} \quad (4)$$

FIGS. 3A to 3G illustrate a result of an electromagnetic field simulation of a distant field in the OAM states L=3, 2, 1, 0, −1, −2, and −3 that are generated by the circular array antenna 200 illustrated in FIG. 2. The x, y, and z axes in each figure correspond with those in FIG. 2. In each figure, a dark area indicates where the electromagnetic field strength is low, while a bright area indicates where the electromagnetic field strength is high. Note that FIGS. 1A to 1G may be referenced for a phase distribution of an electric field in each OAM state.

Figure 3A:
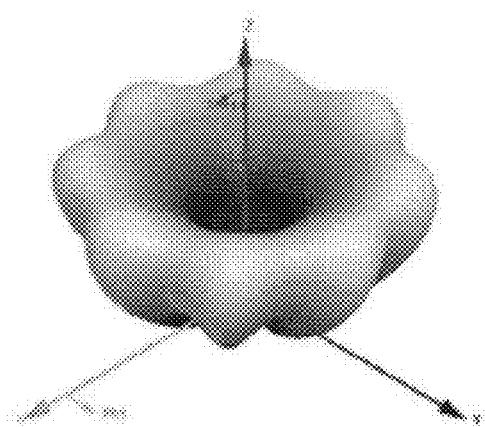
FIG. 3A is a diagram illustrating a result of an electromagnetic field simulation of a distant field in the OAM state L=3 generated by the circular array antenna 200 illustrated in FIG. 2.
Figure 3B:
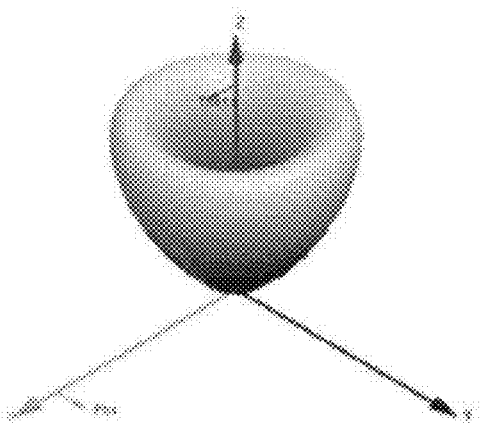
FIG. 3B is a diagram illustrating a result of the electromagnetic field simulation of the distant field in the OAM state L=2 generated by the circular array antenna 200 illustrated in FIG. 2.
Figure 3C:
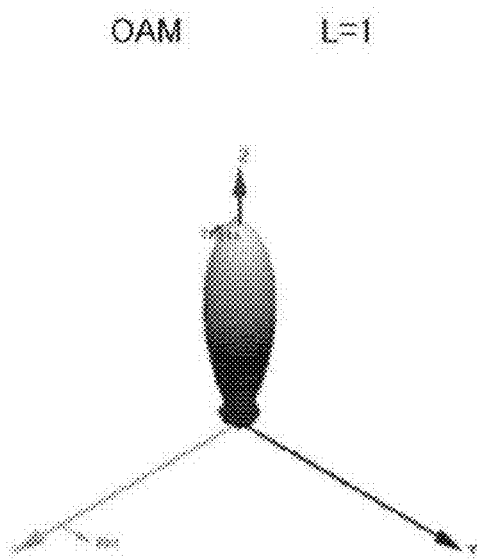
FIG. 3C is a diagram illustrating a result of the electromagnetic field simulation of the distant field in the OAM state L=1 generated by the circular array antenna 200 illustrated in FIG. 2.
Figure 3D:
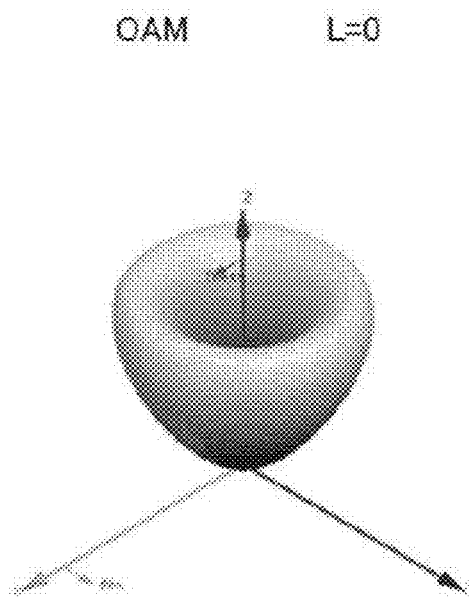
FIG. 3D is a diagram illustrating a result of the electromagnetic field simulation of the distant field in the OAM state L=0 generated by the circular array antenna 200 illustrated in FIG. 2.
Figure 3E:
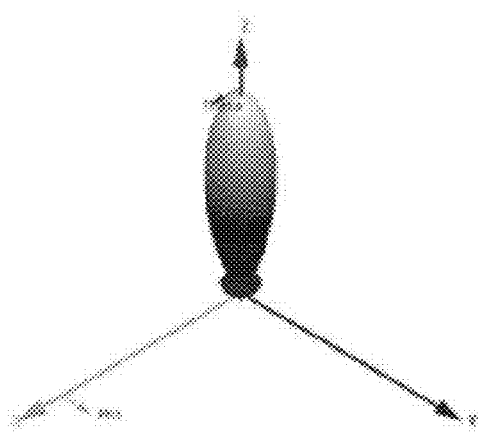
FIG. 3E is a diagram illustrating a result of the electromagnetic field simulation of the distant field in the OAM state L=−1 generated by the circular array antenna 200 illustrated in FIG. 2.
Figure 3F:
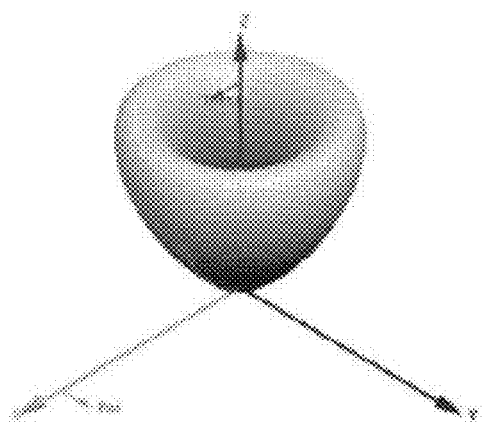
FIG. 3F is a diagram illustrating a result of the electromagnetic field simulation of the distant field in the OAM state L=−2 generated by the circular array antenna 200 illustrated in FIG. 2.
Figure 3G:
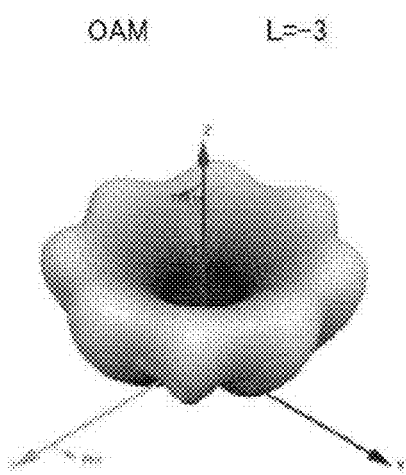
FIG. 3G is a diagram illustrating a result of the electromagnetic field simulation of the distant field in the OAM state L=−3 generated by the circular array antenna 200 illustrated in FIG. 2.

As has been described earlier, the states L=+1 and −1 correspond to the general right-hand circularly polarized wave and left-hand circularly polarized wave, respectively. The distant field for the right-hand circularly polarized wave and the left-hand circularly polarized wave has a beam concentrating in the direction of propagation as illustrated in FIGS. 3C and 3E. The distant field for the other OAM states has a cup-shaped beam with a null formed at the center as illustrated in FIGS. 3A, 3B, 3D, 3F, and 3G.

When finding an electric field emitted in the direction of propagation by the circular array antenna 200 illustrated in FIG. 2, an analysis is performed while assuming that each of the patch antennas 201 to 202 emits an elliptically polarized wave to not lose generality, though the antenna ideally emits a linearly polarized wave.

An elliptically polarized wave $E_1$ of the electric field emitted in the direction of propagation by the first patch antenna is expressed in expression (5). Note that in expression (5), U and V are unit vectors of orthogonally polarized waves with a and b representing the amplitudes of the vectors, respectively.

[Mathematical Formula 5]

$$E_1 = aU + bV \quad (5)$$

An elliptically polarized wave $E_n$ of the electric field emitted in the direction of propagation by the n-th patch antenna is expressed in expression (6).

[Mathematical Formula 6]

$$E_n = [\{a\cos(\phi_n) - jb\sin(\phi_n)\}U + \{a\sin(\phi_n) + jb\cos(\phi_n)\}V]\exp(j\Phi_n) \quad (6)$$

By substituting expressions (2) to (4) into expression (6) and solving it, a composite electric field E emitted in the direction of propagation by n patch antennas is found as expressed in expression (7).

[Mathematical Formula 7]

$$E = \begin{cases} \dfrac{(a+b)}{2}N(U+jV) & (L=1) \\ \dfrac{(a-b)}{2}N(U-jV) & (L=-1) \\ 0 & (\text{otherwise}) \end{cases} \quad (7)$$

According to expression (7), the amplitudes of the polarized vectors U and V are equal when L=+1 and −1, so that the composite electric field E is expressed by a perfect circularly polarized vector. When each patch antenna emits the linearly polarized wave, the amplitudes of the polarized vectors U and V are also equal although either one of the amplitudes a and b equals zero, so that the composite electric field E is expressed by the perfect circularly polarized wave. This is why the circularly polarized wave is generated when L=+1 and −1.

Moreover, one can see from expression (7) that the composite electric field E becomes zero when L=0, ±2, and ±3. This is why the distant field has the cup-shaped beam with the null formed at the center as illustrated in FIGS. 3A, 3B, 3D, 3F, and 3G. The communication range becomes shorter since energy is dispersed compared to the case where the beam of the distant field concentrates in the direction of propagation as illustrated in FIGS. 3C and 3E.

Figure 4:
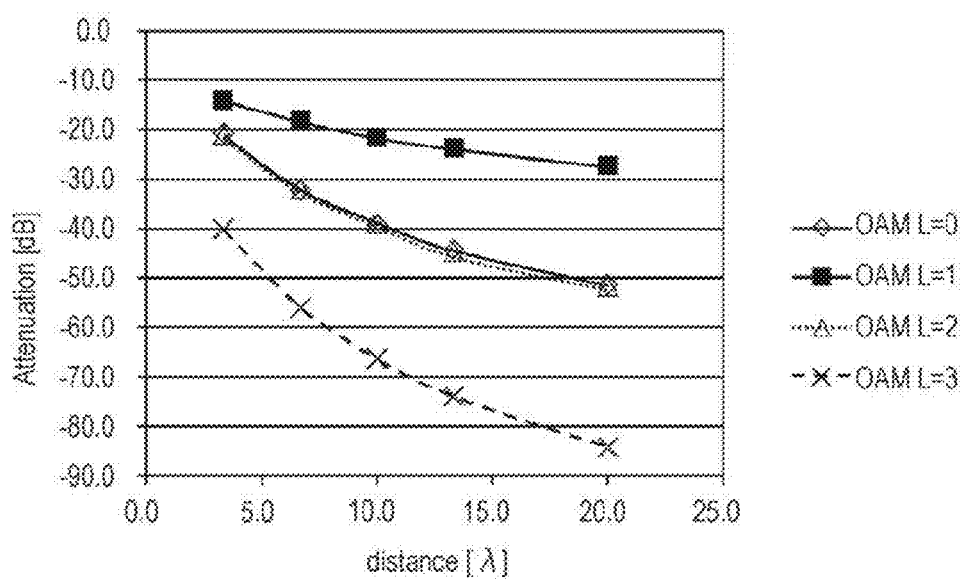
FIG. 4 is a graph illustrating a simulation result of a propagation loss of a whirl of waves in each OAM state when circularly polarized array antennas are disposed to face each other while varying the distance therebetween.

FIG. 4 and Table 1 illustrate a simulation result of a propagation loss of the whirl of waves in each of the OAM states L=0, 1, 2, and 3 when a pair of circular array antennas in the same OAM state are disposed to face each other while varying the distance therebetween. Note that the distance is expressed as a used wavelength λ. Note that although omitted in FIG. 4 and Table 1, results for the OAM states L=−1, −2, and −3 are similar to the results for the OAM states L=1, 2, and 3, respectively.

TABLE 1

| DISTANCE | ATTENUATION [dB] | | | |
|---|---|---|---|---|
| [λ] | OAM L = 0 | OAM L = 1 | OAM L = 2 | OAM L = 3 |
| 3.3 | −20.6 | −14.0 | −21.0 | −40.0 |
| 6.7 | −32.3 | −18.0 | −32.0 | −56.1 |
| 10.0 | −39.1 | −21.5 | −39.0 | −66.3 |
| 13.3 | −44.2 | −23.7 | −44.7 | −73.9 |
| 20.0 | −51.3 | −27.2 | −51.7 | −84.3 |

The graph of the OAM state L=1 indicates that the attenuation increases by 6 dB when the distance is doubled. Therefore, one can see that the waves reaching the opposing array antennas attenuate in proportion to the square of the distance.

Moreover, the graphs of the OAM states L=0 and 2 indicate that the attenuation increases by 12 dB when the distance is doubled. Therefore, one can see that the waves reaching the opposing array antennas attenuate in proportion to the fourth power of the distance.

Moreover, the graph of the OAM state L=3 indicates that the attenuation increases by 18 dB when the distance is doubled. Therefore, one can see that the waves reaching the opposing array antennas attenuate in proportion to the sixth power of the distance.

The aforementioned examination makes it clear that the whirl of waves is generated by the aforementioned method, the waves attenuate in proportion to the fourth power of the distance in wireless communication using the whirl of waves in the OAM state L=0 or L=±2, and the waves attenuate in proportion to the sixth power of the distance in wireless communication using the whirl of waves in the state L=±3. The waves in the OAM states L=±1 attenuate less with the increase in the distance since the beam of the distant field concentrates in the direction of propagation. On the other hand, the waves in the OAM states L=0, ±2, and ±3 attenuate more with the increase in the distance since energy is dispersed in the distant field that is cup-shaped with the null formed at the center.

When the low-gain electric field induction antenna is used in the short range wireless communication using the millimeter wave, the communication range becomes very narrow so that one cannot obtain a feel of a touch operation similar to the feel obtained with the short range wireless communication scheme using the UWB. On the other hand, when a normal antenna with the radiated waves attenuating in proportion to the square of the distance is used, a difference in the attenuation characteristic causes the waves to reach an area beyond a desired communication area (as described above). Now, according to the technology disclosed in the present description, the initiator and the responder are both equipped with the array antenna generating the whirl of waves to perform communication by using the whirl of waves in the state (L=0 or L=±2) characteristically attenuating in proportion to the fourth power of the distance, so that the party at the other end approaching can easily be detected while at the same time properly restricting the communication area and preventing improper connection. A user can also obtain the feel of the touch operation similar to the feel obtained with the short range wireless communication scheme using the UWB.

Incidentally, when the initiator and the responder are both equipped with the array antenna generating the whirl of waves to use the whirl of waves in the state (L=±1) characteristically attenuating in proportion to the square of the distance, the waves reach an area beyond a communication area desired for the short range wireless communication.

First Example

Figure 5:
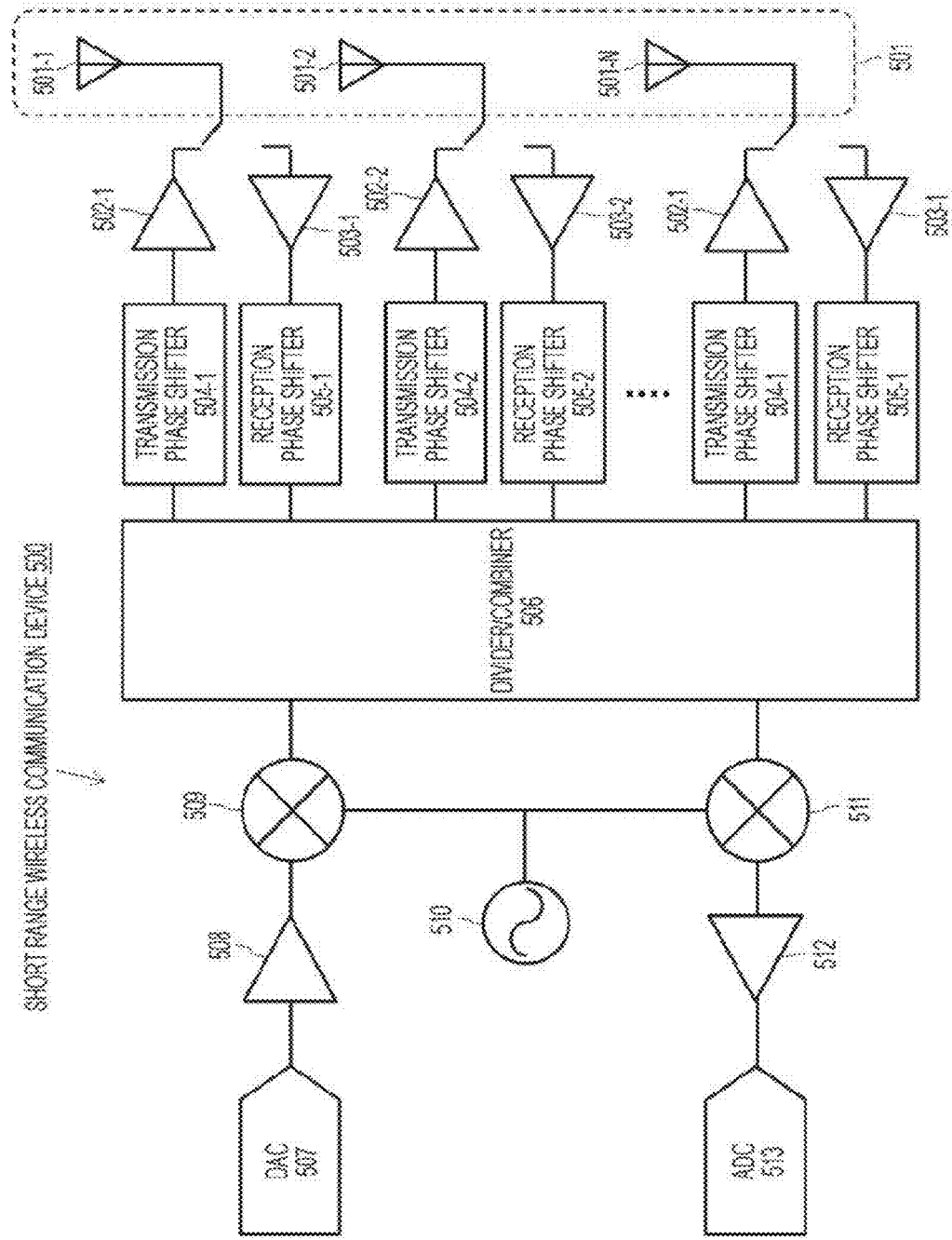
FIG. 5 is a diagram illustrating a configuration example (a first example) of a short range wireless communication device 500 using a whirl of waves.

FIG. 5 illustrates a configuration example (a first example) of a short range wireless communication device 500 using the whirl of waves.

The short range wireless communication device 500 includes a circular array antenna 501 formed of N antenna elements 501-1, 501-2 to 501-N.

The antenna elements 501-1, 501-2 to 501-N are each formed of the linearly polarized patch antenna and disposed at regular intervals along a circumference of a circle with a predetermined radius on the top surface of a double-sided printed circuit board with a GND layer formed on the bottom surface thereof (refer to FIG. 2), thereby making up the circular array antenna 501. While a specific configuration of the linearly polarized patch antennas being used will not be described, each antenna has a structure and dimensions to be able to transmit and receive a signal of a desired radio frequency band, namely the millimeter wave band.

The antenna elements 501-1, 501-2 to 501-N of the short range wireless communication device 500 are provided with N corresponding transmission amplifiers 502-1, 502-2 to 502-N, reception amplifiers 503-1, 503-2 to 503-N, transmission phase shifters 504-1, 504-2 to 504-N, and reception phase shifters 505-1, 505-2, to 505-N. The short range wireless communication device 500 further includes a divider/combiner 506, a digital-to-analog converter (DAC) 507, a power amplifier 508, an up converter 509, an oscillator 510, a down converter 511, a low-noise amplifier 512, and an analog-to-digital converter (ADC) 513.

At the time of transmission, a digitally transmitted signal from a higher layer (not shown) is converted into an analog signal by the digital-to-analog converter 507, amplified by the power amplifier 508, and up-converted to a desired radio frequency band (such as the millimeter wave band) by the up converter 509 while using an oscillating frequency of the oscillator 510. The divider/combiner 506 divides the up-converted analog transmitted signal among the transmission phase shifters 504-1, 504-2 to 504-N.

The transmitted signal that is phase shifted by each of the transmission phase shifters 504-1, 504-2 to 504-N is amplified by each of the transmission amplifiers 502-1, 502-2 to 502-N and then sent out from each of the antenna elements 501-1, 501-2 to 501-N. The transmission phase shifters 504-1, 504-2 to 504-N shift the phase of the transmitted signal from each of the antenna elements 501-1, 501-2 to 501-N by the excitation phase expressed in expression (4), so that the circular array antenna 501 can transmit the whirl of waves in a desired OAM state L.

At the time of reception, on the other hand, a received signal of each of the antenna elements 501-1, 501-2 to 501-N is amplified by each of the reception amplifiers 503-1, 503-2 to 503-N, phase shifted by each of the reception phase shifters 505-1, 505-2 to 505-N, and then combined by the divider/combiner 506. The reception phase shifters 505-1, 505-2 to 505-N shift the phase of the received signal according to expression (4) so that the circular array antenna 501 can receive the whirl of waves in a desired OAM state L.

The down converter 511 uses the oscillating frequency of the oscillator 510 to down-convert the received signal of the radio frequency band (such as the millimeter wave band) being combined. The down-converted received signal is amplified by the low-noise amplifier 512 and converted into a digital received signal by the analog-to-digital converter 513 to be passed to the higher layer (not shown).

Table 2 illustrates the phase of each of the transmission phase shifters 504-1, 504-2 to 504-N and the reception phase shifters 505-1, 505-2 to 505-N required for the short range wireless communication device 500 to transmit and receive the whirl of waves in the OAM state L=1. In the table, the value of a phase $\Phi_n$ of an n-th transmission phase shifter 504-$n$ is expressed in radians by substituting N=8 and L=1 into expression (4). On the other hand, as the whirl of waves appears to be rotated in a reverse direction from the receiving side, the value of a phase $\Phi_n$ of an n-th reception phase shifter 505-$n$ is expressed in radians by substituting N=8 and L=−1 into expression (4). These phase values $\Phi_n$ are relative values with respect to the first patch antenna. In this case, the waves reaching the party at the other end attenuate in proportion to the square of the distance (refer to FIG. 4).

TABLE 2

| | n | | | | | | | |
|---|---|---|---|---|---|---|---|---|
| | 1 | 2 | 3 | 4 | 5 | 6 | 7 | 8 |
| $\phi_{nTX}$ [rad] | 0 | π/4 | π/2 | 3π/4 | π | 5π/4 | 3π/2 | 7π/4 |
| $\phi_{nRX}$ [rad] | 0 | 7π/4 | 3π/2 | 5π/4 | π | 3π/4 | π/2 | π/4 |

Moreover, Table 3 illustrates the phase of each of the transmission phase shifters 504-1, 504-2 to 504-N and the reception phase shifters 505-1, 505-2 to 505-N required for the short range wireless communication device 500 to transmit and receive the whirl of waves in the OAM state L=2. In the table, the value of the phase $\Phi_n$ of the n-th transmission phase shifter 504-$n$ is expressed in radians by substituting N=8 and L=2 into expression (4). On the other hand, as the whirl of waves appears to be rotated in the reverse direction from the receiving side, the value of the phase $\Phi_n$ of the n-th reception phase shifter 505-$n$ is expressed in radians by substituting N=8 and L=−2 into expression (4). These phase values $\Phi_n$ are relative values with respect to the first patch antenna.

TABLE 3

| | n | | | | | | | |
|---|---|---|---|---|---|---|---|---|
| | 1 | 2 | 3 | 4 | 5 | 6 | 7 | 8 |
| $\phi_{nTX}$ [rad] | 0 | π/2 | π | 3π/2 | 0 | π/2 | π | 3π/2 |
| $\phi_{nRX}$ [rad] | 0 | 3π/2 | π | π/2 | 0 | 3π/2 | π | π/2 |

In this case, the waves reaching the party at the other end attenuate in proportion to the fourth power of the distance (refer to FIG. 4). As a result, when the short range wireless communication device 500 is used while setting the OAM state L=2 by the transmission phase shifters 504-1, 504-2 to 504-N and the reception phase shifters 505-1, 505-2 to 505-N, the approach of the party at the other end can easily be detected while at the same time properly restricting the communication area and preventing improper connection. Moreover, a user of the short range wireless communication device 500 can obtain a feel of a touch operation similar to the feel obtained with the short range wireless communication scheme using the UWB.

Moreover, Table 4 illustrates the phase of each of the transmission phase shifters 504-1, 504-2 to 504-N and the reception phase shifters 505-1, 505-2 to 505-N required for the short range wireless communication device 500 to transmit and receive the whirl of waves in the OAM state L=3. In the table, the value of the phase $\Phi_n$ of the n-th transmission phase shifter 504-$n$ is expressed in radians by substituting N=8 and L=3 into expression (4). On the other hand, as the whirl of waves appears to be rotated in the reverse direction from the receiving side, the value of the phase $\Phi_n$ of the n-th reception phase shifter 505-$n$ is expressed in radians by substituting N=8 and L=−3 into expression (4). These phase values $\Phi_n$ are relative values with respect to the first patch antenna. In this case, the waves reaching the party at the other end attenuate in proportion to the sixth power of the distance (refer to FIG. 4).

TABLE 4

| | n | | | | | | | |
|---|---|---|---|---|---|---|---|---|
| | 1 | 2 | 3 | 4 | 5 | 6 | 7 | 8 |
| $\phi_{nTX}$ [rad] | 0 | 3π/4 | 3π/2 | π/4 | π | 7π/4 | π/2 | 5π/4 |
| $\phi_{nRX}$ [rad] | 0 | 5π/4 | π/2 | 7π/4 | π | π/4 | 3π/2 | 3π/4 |

Second Example

Figure 6:
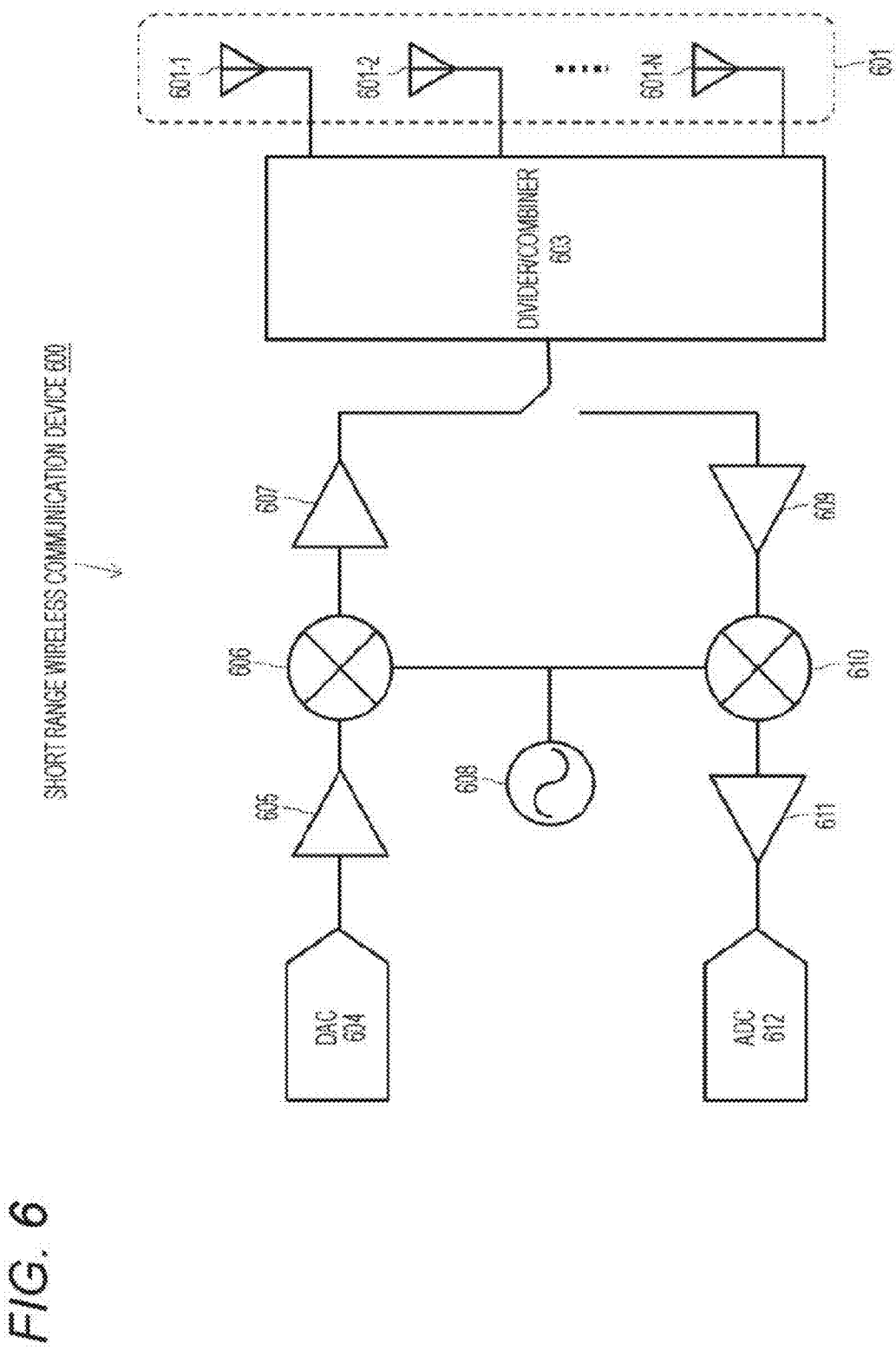
FIG. 6 is a diagram illustrating a configuration example (a second example) of a short range wireless communication device 600 using the whirl of waves.

FIG. 6 illustrates a configuration example (a second example) of a short range wireless communication device 600 using the whirl of waves.

The short range wireless communication device 600 includes a circular array antenna 601 formed of N antenna elements 601-1, 601-2 to 601-N.

The antenna elements 601-1, 601-2 to 601-N are each formed of a linearly polarized patch antenna and disposed at regular intervals along a circumference of a circle with a predetermined radius on a top surface of a double-sided printed circuit board with a GND layer formed on a bottom surface thereof (refer to FIG. 2), thereby making up the circular array antenna 601. While a specific configuration of the linearly polarized patch antenna being used will not be described, each antenna has a structure and dimensions to be able to transmit and receive a signal of a desired radio frequency band, namely the millimeter wave band.

The short range wireless communication device 600 further includes a divider/combiner 603, a digital-to-analog converter (DAC) 604, a power amplifier 605, an up converter 606, a transmission amplifier 607, an oscillator 608, a reception amplifier 609, a down converter 610, a low-noise amplifier 611, and an analog-to-digital converter (ADC) 612.

At the time of transmission, a digitally transmitted signal from a higher layer (not shown) is converted into an analog signal by the digital-to-analog converter 604, amplified by the power amplifier 605, up-converted to a desired radio frequency band (such as the millimeter wave band) by the up converter 606 while using an oscillating frequency of the oscillator 608, and then amplified by the transmission amplifier 607. Then, the divider/combiner 603 divides the transmitted signal among the antenna elements 601-1, 601-2 to 601-N equally in phase.

At the time of reception, on the other hand, a received signal of each of the antenna elements 601-1, 601-2 to 601-N is combined equally in phase by the divider/combiner 603 to be amplified by the reception amplifier 609. The down converter 610 uses the oscillating frequency of the oscillator 608 to down-convert the received signal of the radio frequency band (such as the millimeter wave band). The down-converted received signal is amplified by the low-noise amplifier 611 and converted into a digital received signal by the analog-to-digital converter 612 to be passed to the higher layer (not shown).

The short range wireless communication device 600 illustrated in FIG. 6 can transmit and receive only the whirl of waves in the OAM state L=0. In this case, the waves reaching the party at the other end attenuate in proportion to the fourth power of the distance (refer to FIG. 4). Therefore, the short range wireless communication device 600 can easily detect the approach of the party at the other end while at the same time properly restricting the communication area and preventing improper connection. Moreover, a user of the short range wireless communication device 600 can obtain a feel of a touch operation similar to the feel obtained with the short range wireless communication scheme using the UWB.

Moreover, unlike the short range wireless communication device 500 illustrated in FIG. 5, the short range wireless communication device 600 illustrated in FIG. 6 does not require a phase shifter and thus has an advantage in that a circuit is simplified.

Third Example

Figure 7:
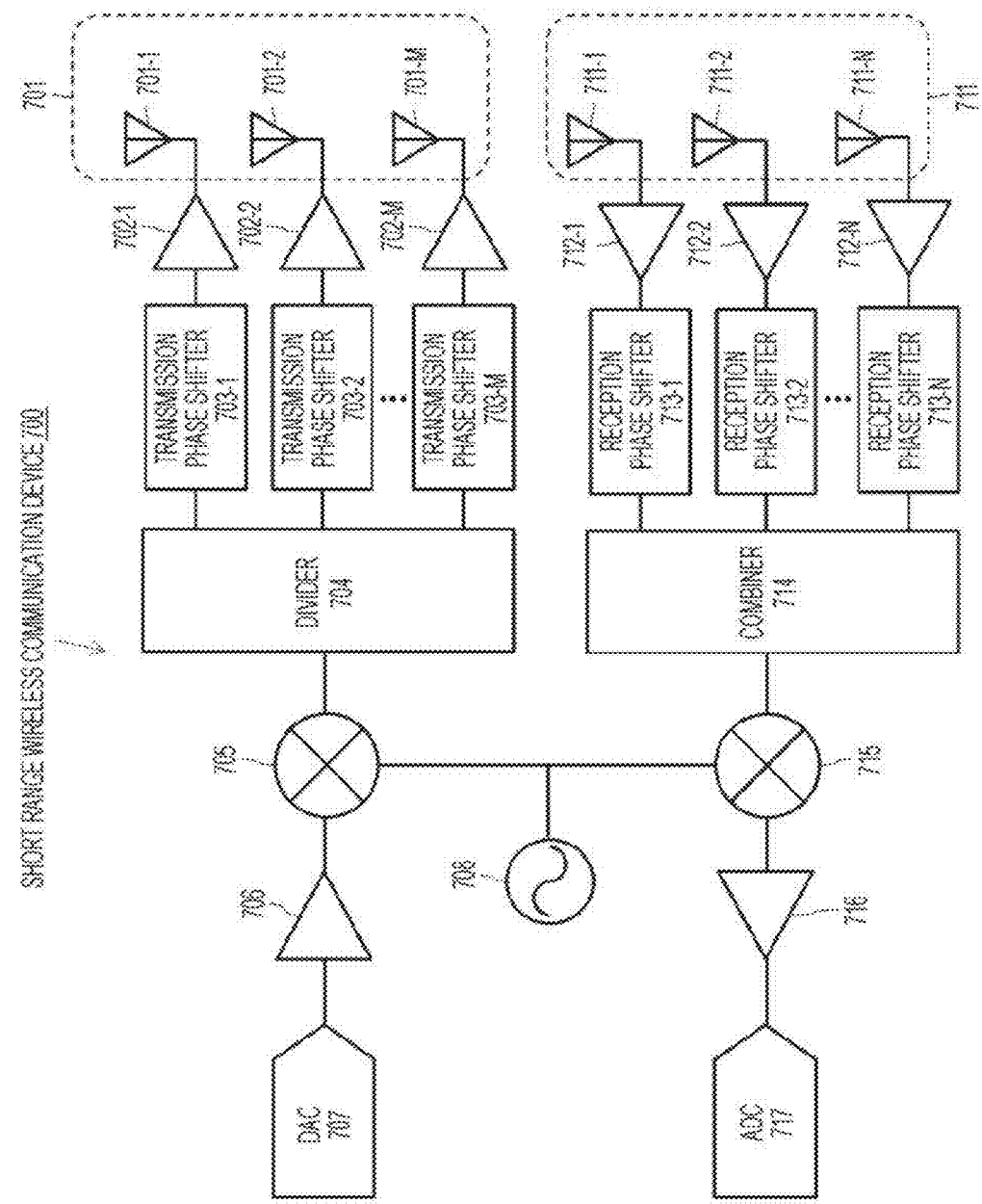
FIG. 7 is a diagram illustrating a configuration example (a third example) of a short range wireless communication device 700 including antenna units individually for transmission and reception.

FIG. 7 illustrates a configuration example (a third example) of a short range wireless communication device 700 including antenna units individually for transmission and reception.

The short range wireless communication device 700 includes a transmission circular array antenna 701 formed of M antenna elements 701-1, 701-2 to 701-M and a reception circular array antenna 711 formed of N antenna elements 711-1, 711-2 to 711-N.

The antenna elements 701-1, 701-2 to 701-N used for transmission are each formed of a linearly polarized patch antenna and are disposed at regular intervals along a circumference of a circle with a predetermined radius on a top surface of a double-sided printed circuit board with a GND layer formed on a bottom surface thereof (refer to FIG. 2), thereby making up the circular array antenna 701. Moreover, the antenna elements 711-1, 711-2 to 711-N used for reception are each formed of a linearly polarized patch antenna and are disposed at regular intervals along a circumference of a circle with a predetermined radius on a top surface of a double-sided printed circuit board with a GND layer formed on a bottom surface thereof (refer to FIG. 2), thereby making up the circular array antenna 711. While a specific configuration of the linearly polarized patch antennas being used will not be described, each antenna has a structure and dimensions to be able to transmit and receive a signal of a desired radio frequency band, namely the millimeter wave band.

The transmission antenna elements 701-1, 701-2 to 701-M of the short range wireless communication device 700 are provided with M corresponding transmission amplifiers 702-1, 702-2 to 702-M and transmission phase shifters 703-1, 703-2 to 703-M. Moreover, the reception antenna elements 711-1, 711-2 to 711-N of the short range wireless communication device 700 are provided with N corresponding reception amplifiers 712-1, 712-2 to 712-N and reception phase shifters 713-1, 713-2 to 713-N. Moreover, the short range wireless communication device 700 further includes a divider 704, an up converter 705, apower amplifier 706, a digital-to-analog converter (DAC) 707, an oscillator 708, a combiner 714, a down converter 715, a low-noise amplifier 716, and an analog-to-digital converter (ADC) 717. Provided with the antenna units individually for transmission and reception, the short range wireless communication device 700 is different from the short range wireless communication device 500 sharing the antenna unit between transmission and reception.

At the time of transmission, a digitally transmitted signal from a higher layer (not shown) is converted into an analog signal by the digital-to-analog converter 707, amplified by the power amplifier 706, and up-converted to a desired radio frequency band (such as the millimeter wave band) by the up converter 705 while using an oscillating frequency of the oscillator 708. The divider 704 divides the up-converted analog transmitted signal among the transmission phase shifters 703-1, 703-2 to 703-M.

The transmitted signal that is phase shifted by each of the transmission phase shifters 703-1, 703-2 to 703-M is amplified by each of the transmission amplifiers 702-1, 702-2 to 702-M and then sent out from each of the antenna elements 701-1, 701-2 to 701-M. The transmission phase shifters 703-1, 703-2 to 703-M shift the phase of the transmitted signal from each of the antenna elements 701-1, 701-2 to 701-M by the excitation phase expressed in expression (4), so that the circular array antenna 701 can transmit the whirl of waves in a desired OAM state L.

At the time of reception, on the other hand, a received signal of each of the antenna elements 711-1, 711-2 to 711-N is amplified by each of the reception amplifiers 712-1, 712-2 to 712-N, phase shifted by each of the reception phase shifters 713-1, 713-2 to 713-N, and then combined by the combiner 713. The reception phase shifters 713-1, 713-2 to 713-N shift the phase of the received signal of each of the antenna elements 711-1, 711-2 to 711-N according to expression (4) so that the circular array antenna 711 can receive the whirl of waves in a desired OAM state L.

The down converter 715 uses the oscillating frequency of the oscillator 708 to down-convert the combined received signal of the radio frequency band (such as the millimeter waveband). The down-converted received signal is amplified by the low-noise amplifier 716, converted into a digital received signal by the analog-to-digital converter 717, and then passed to the higher layer (not shown).

When the short range wireless communication device 700 illustrated in the figure is to be used in a short range wireless communication system using the millimeter wave band, each of the transmission phase shifters 703-1, 703-2 to 703-M may shift the phase of the transmitted signal from each of the antenna elements 701-1, 701-2 to 701-M according to expression (4) in order for the circular array antenna 701 to be able to transmit the whirl of waves in a desired OAM state L=±2 or L=0, and shift the phase of the received signal of each of the antenna elements 711-1, 711-2 to 711-N according to expression (4) in order for the circular array antenna 711 to be able to receive the whirl of waves in the desired OAM state L.

Figure 8:
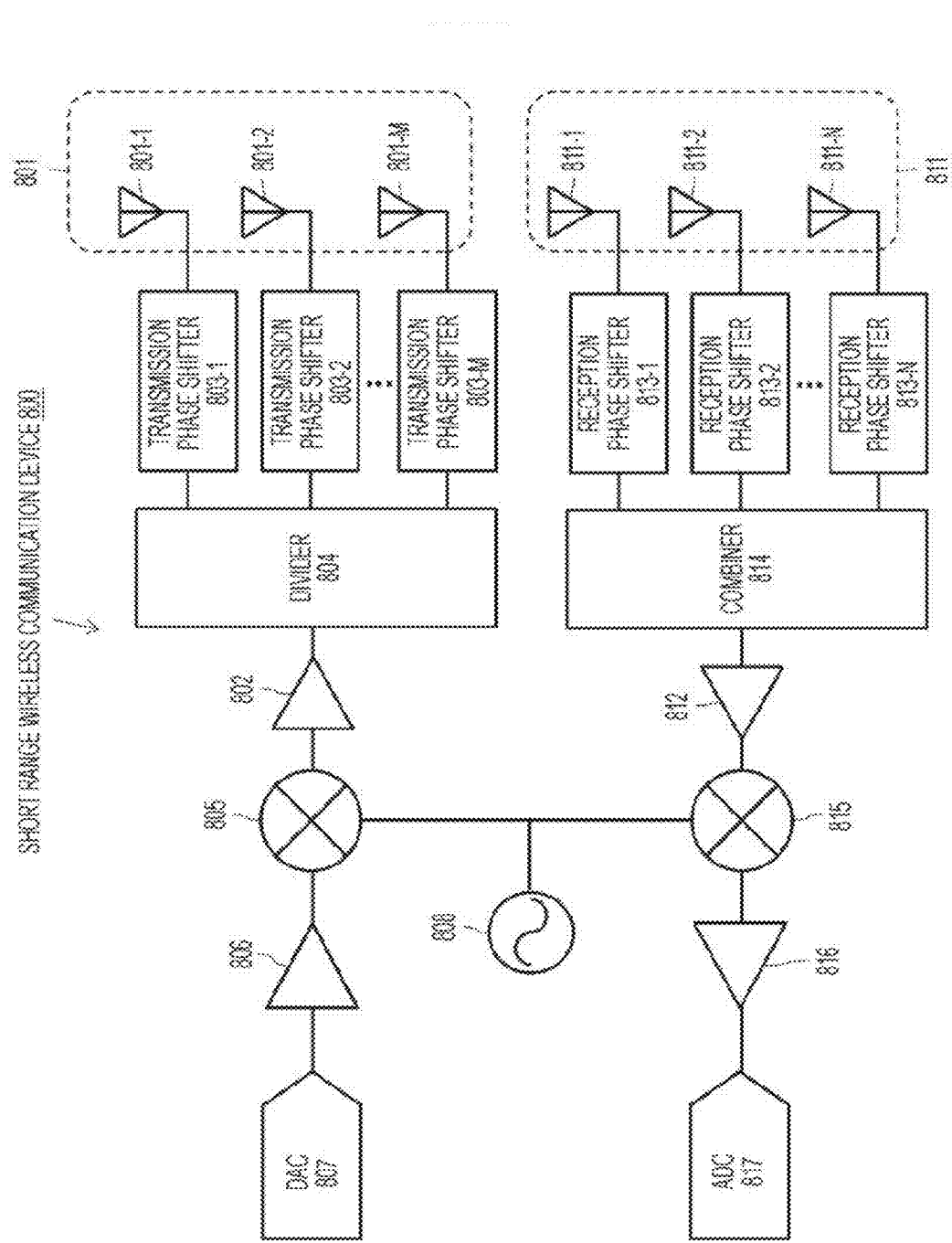
FIG. 8 is a diagram illustrating a variation of a short range wireless communication device 800 including antenna units individually for transmission and reception.

Moreover, FIG. 8 illustrates a variation of a short range wireless communication device 800 including antenna units individually for transmission and reception. The short range wireless communication device 800 is different from the short range wireless communication device 700 illustrated in FIG. 7 in that a transmitted signal before being divided into transmission antenna elements 801-1, 801-2 to 801-M is amplified by a single transmission amplifier 802 while a received signal of each of antenna elements 811-1, 811-2 to 811-N is combined to be amplified by a single reception amplifier 812. The rest is substantially similar to the short range wireless communication device 700, whereby a detailed description of the short range wireless communication device 800 will be omitted.

Figure 9:
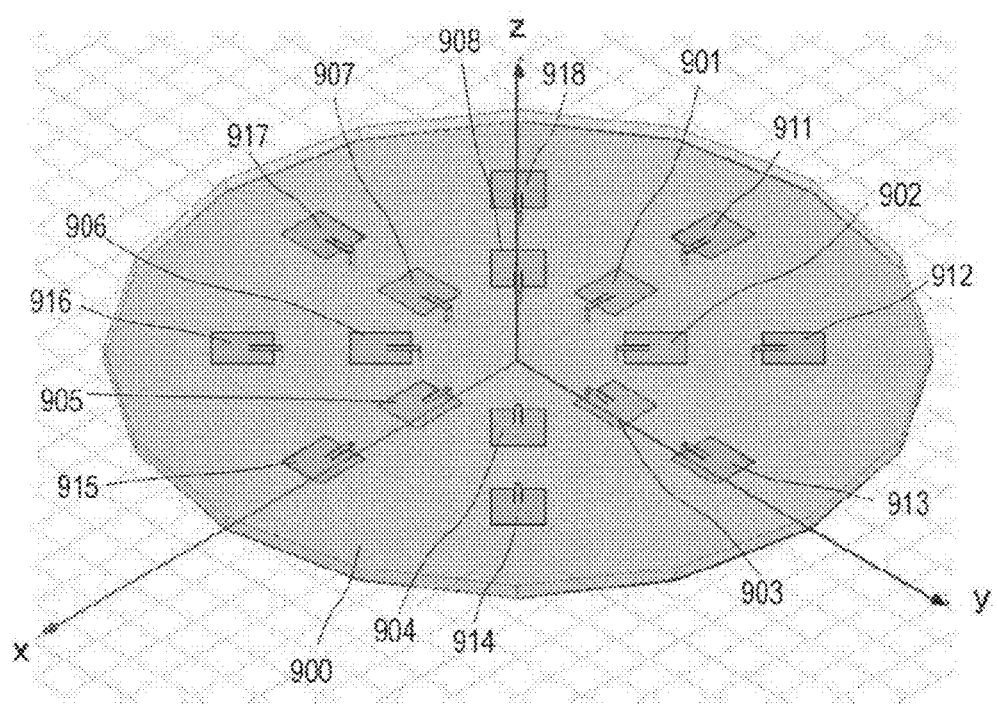
FIG. 9 is a diagram illustrating a configuration example of a transmission/reception circular array antenna.

FIG. 9 illustrates a configuration example of a transmission/reception circular array antenna that can be used in the short range wireless communication devices 700 and 800 illustrated in FIGS. 7 and 8. Note that the total number of antenna elements is M=N=8 in this example.

Eight linearly polarized patch antennas 901 to 908 making up a transmission circular array antenna are disposed at regular intervals along a circumference of a circle with a predetermined radius on a top surface of a double-sided printed circuit board 900 with a GND layer formed on a bottom surface of the board. Each of the linearly polarized patch antennas 901 to 908 is disposed such that a feeding unit of the antenna faces the center of the circle according to the sequential rotation technique. While a specific configuration of the linearly polarized patch antennas being used will not be described, each antenna has a structure and dimensions to be able to transmit and receive a signal of a desired radio frequency band, namely the millimeter wave band.

Moreover, eight linearly polarized patch antennas 911 to 918 making up a reception circular array antenna are disposed at regular intervals along a circumference of a circle concentric with the circle of the transmission circular array antenna, on the top surface of the same double-sided printed circuit board 900. Each of the linearly polarized patch antennas 911 to 918 is also disposed such that a feeding unit of the antenna faces the center of the circle according to the sequential rotation technique. While a specific configuration of the linearly polarized patch antennas being used will not be described, each antenna has a structure and dimensions to be able to transmit and receive a signal of a desired radio frequency band, namely the millimeter wave band.

In the example illustrated in the figure, the linearly polarized patch antennas 901 to 908 for transmission are disposed along the circumference of the inner circle, whereas the eight linearly polarized patch antennas 911 to 918 for reception are disposed along the circumference of the outer circle. The transmission circular array antenna is disposed on the inner side because a distant field of the whirl of waves in the OAM states L=±2 and 0 used in short range wireless communication forms a cup-shaped beam with a null formed at the center (refer to FIGS. 3B, 3D and 3F). That is, since the whirl of waves generated from the linearly polarized patch antennas 901 to 908 widens outward as it travels, the party at the other end can sensitively receive the waves with the linearly polarized patch antennas 911 to 918 disposed on the outer side.

Fourth Example

Figure 10:
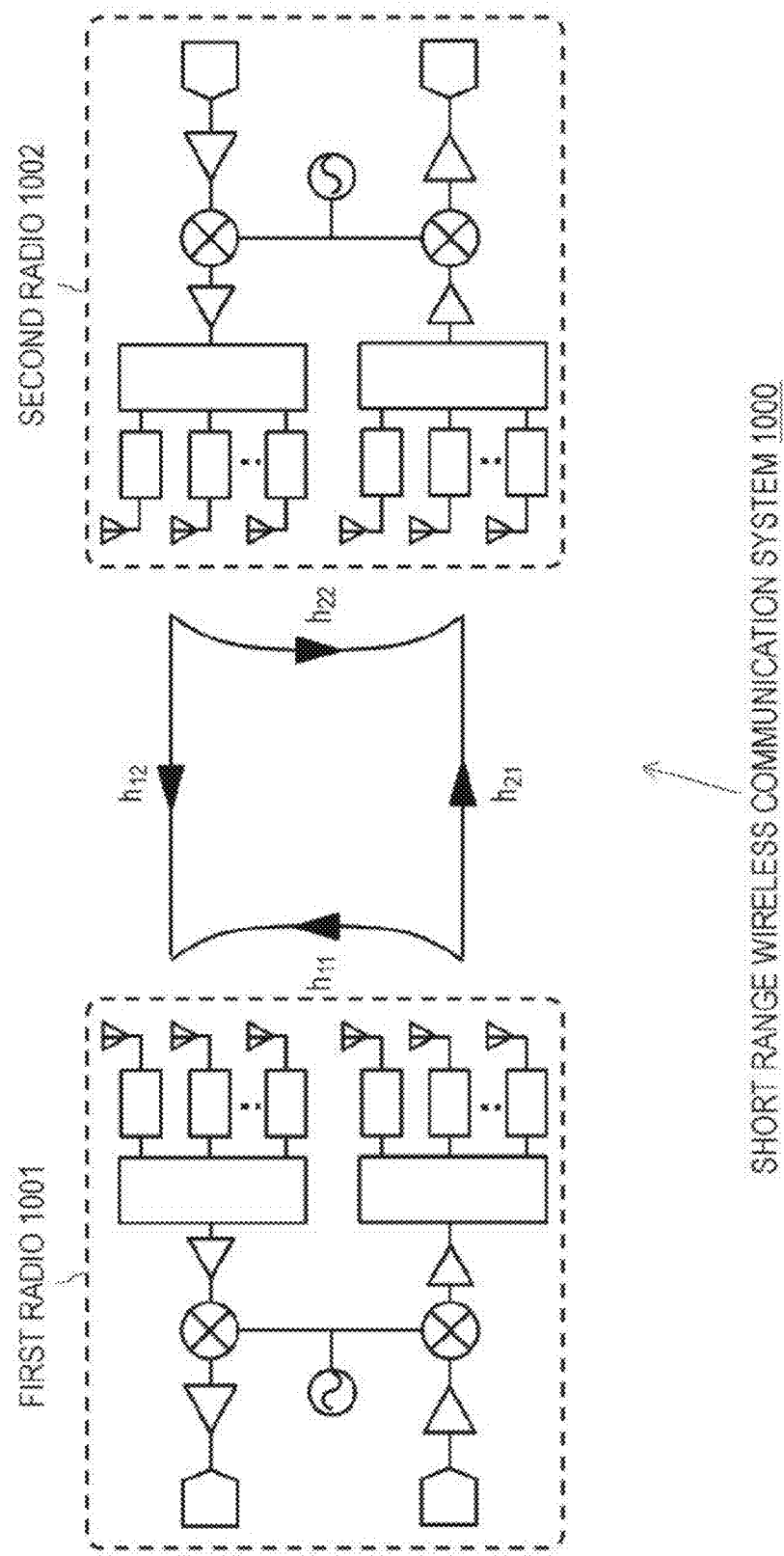
FIG. 10 is a diagram illustrating a configuration example (a fourth example) of a short range wireless communication system 1000 using the whirl of waves.

FIG. 10 illustrates a configuration example (a fourth example) of a short range wireless communication system 1000 using the whirl of waves. The short range wireless communication system 1000 illustrated in the figure includes a first radio 1001 and a second radio 1002 to perform one-to-one full duplex communication by short range wireless communication using the whirl of waves. Each of the first radio 1001 and the second radio 1002 is formed of the short range wireless communication device 800 including the antenna units individually for transmission and reception as illustrated in FIG. 8, for example.

It is known in this industry to perform the full duplex communication by a method such as frequency division duplex (FDD) in which the frequency is divided between uplink and downlink or time division duplex (TDD) in which time is divided between the uplink and downlink. In the full duplex communication performing transmission and reception simultaneously with the same frequency (in other words, the frequency and time are not divided between the uplink and downlink), a part of the waves emitted from a transmission antenna is input to a reception antenna as an intense signal and saturates a low noise amplifier (LNA), in which case an analog interference canceller suppressing the transmitted waves is required. The analog interference canceller adopts a method of cancelling an interference wave by adding a replica signal that is in anti-phase therewith, but it is difficult to generate a highly accurate anti-phase replica signal in the high-frequency millimeter wave, thereby causing a number of problems.

On the other hand, the present example uses the property that the whirls of waves in difference OAM states orthogonally intersect each other (as described above) to perform the full duplex communication without using the analog interference canceller. Specifically, the whirl of waves in an OAM state L=2 is used in a transmission from the first radio 1001 to the second radio 1002, whereas the whirl of waves in an OAM state L=−2 is used in a transmission from the second radio 1002 to the first radio 1001. The whirls of waves in the different OAM states are used in the transmission and reception, so that each of the first radio 1001 and the second radio 1002 has a transmission antenna and a reception antenna separately. Each of the first radio 1001 and the second radio 1002 preferably includes the transmission/reception circular array antenna illustrated in FIG. 9.

It is now assumed that $h_{21}$ indicates a propagation characteristic of a path along which the whirl of waves in the OAM state L=2 transmitted by a transmission array antenna of the first radio 1001 reaches a reception array antenna of the second radio 1002 while $h_{12}$ indicates a propagation characteristic of a path along which the whirl of waves in the OAM state L=−2 transmitted by a transmission array antenna of the second radio 1002 reaches the first radio 1001.

It is further assumed that $h_{11}$ indicates a propagation characteristic of a path along which the whirl of waves transmitted by the transmission array antenna of the first radio 1001 reaches a reception array antenna of the first radio 1001 by coupling between the transmission and reception antennas, while $h_{22}$ indicates a propagation characteristic of a path along which the whirl of waves transmitted by the transmission array antenna of the second radio 1002 reaches the reception array antenna of the second radio 1001 by coupling between the transmission and reception antennas.

The propagation characteristics $h_n$ and $h_{12}$ between the first radio 1001 and the second radio 1002 change from −20 dB to −50 dB with the change in the distance from 3λ to 20λ as illustrated in FIG. 4 and Table 1. On the other hand, $h_{11}$ and $h_{22}$ each being the coupling between the transmission and reception antennas in each of the first radio 1001 and the second radio 1002 can have a constant value of −60 dB or less by increasing the precision of manufacturing and the excitation phase of the antenna.

Where $h_{21}$ [dB] denotes a propagation loss of transmitted power $P_t$ [dBm] from the second radio 1002 and IL [dB] denotes an implementation loss, received power S [dBm] of the first radio 1001 is expressed by expression (8).

[Mathematical Formula 8]

$$S = P_t + h_{12} - IL \quad (8)$$

Moreover, where B [Hz] denotes a bandwidth and NF [dB] denotes a noise figure, a noise received N [dBm] by the first radio 1001 is expressed by expression (9).

[Mathematical Formula 9]

$$N = -174 + 10 \log_{10}(B) + NF \quad (9)$$

Furthermore, where $P_t$ [dBm] denotes transmitted power from the first radio 1001 and $h_{11}$ [dB] denotes isolation, interference power I [dBm] received by the first radio 1001 is expressed by expression (10).

[Mathematical Formula 10]

$$I = P_t + h_{11} \quad (10)$$

Expressions (8) to (10) are then used to be able to express a signal-to-interference plus noise power ratio SINR of the first radio 1001 during reception as in expression (11).

[Mathematical Formula 11]

$$SINR = S - 10\log_{10}\left(10^{\frac{I}{10}} + 10^{\frac{N}{10}}\right) \quad (11)$$

Figure 11:
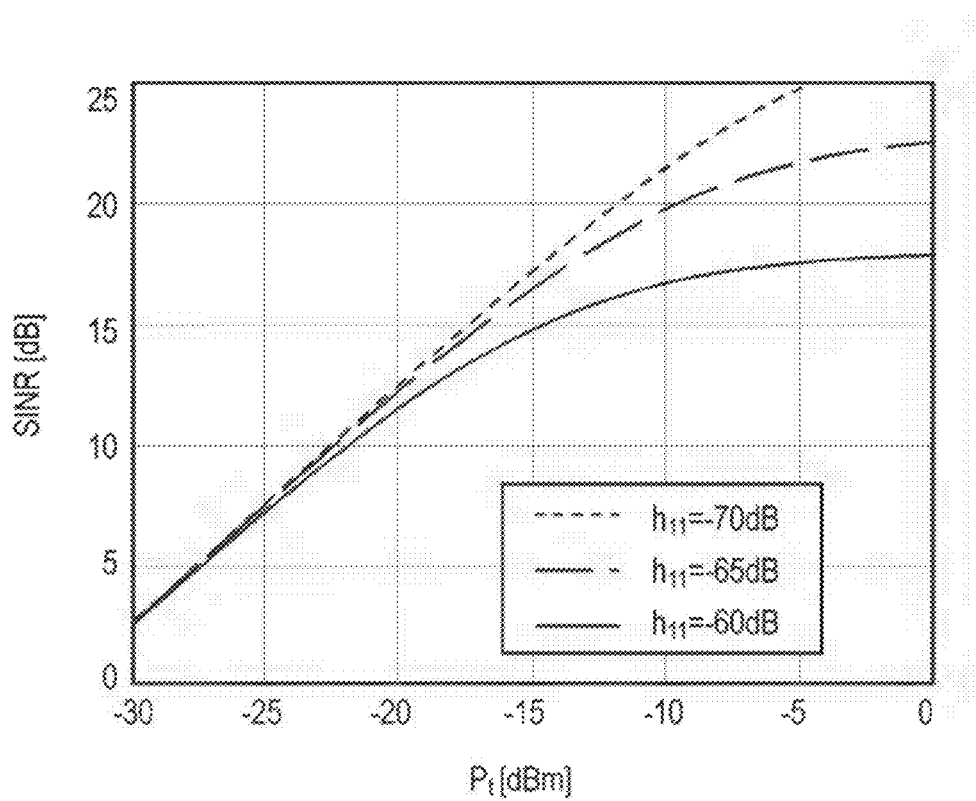
FIG. 11 is a graph illustrating an SINR curve swept by using $h_{11}$ as well as transmitted power $P_t$ from each of a first radio 1001 and a second radio 1002 as parameters.

FIG. 11 illustrates an example of a graph of the SINR curve swept by using $h_{11}$ as well as the transmitted power $P_t$ from each of the first radio 1001 and the second radio 1002 as parameters when $h_{21}$=−40 [dB], B=2.16 [GHz], IL=2 [dB], and NF=6 [dB].

Figure 12:
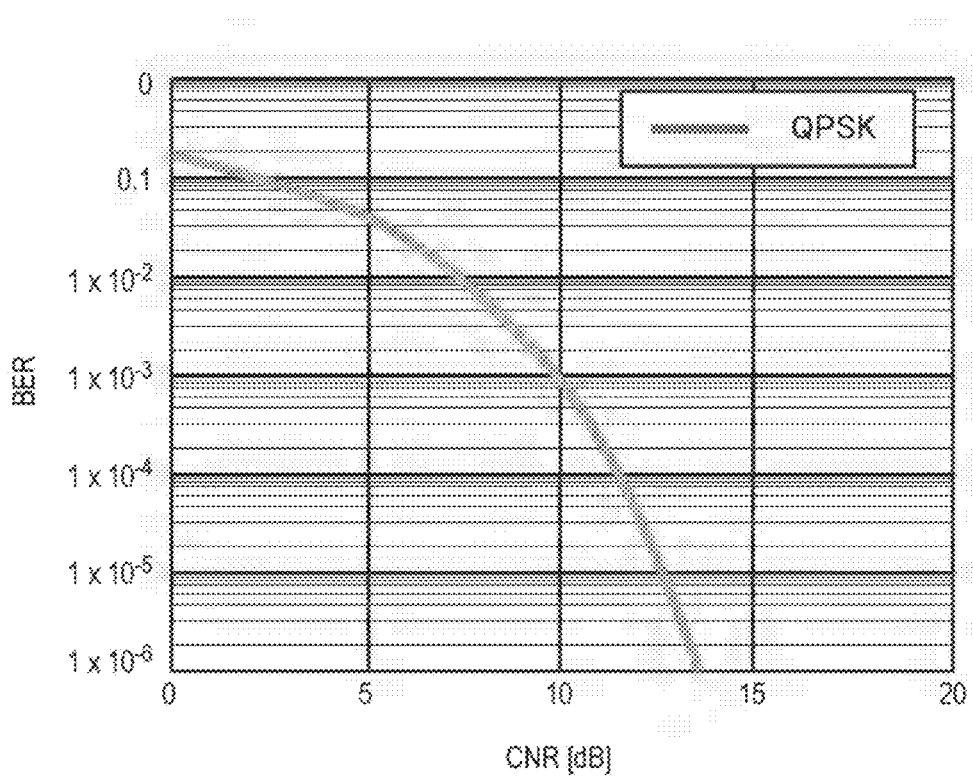
FIG. 12 is a graph illustrating a relationship between BER and CNR when QPSK is used as a modulation method.

It is known in this industry that a bit error rate (BER) and a carrier noise ratio (CNR) have a relationship expressed in expression (12) when quadrature phase shift keying (QPSK) is employed as a modulation method. Accordingly, the CNR of approximately 10 dB is required to obtain the BER=$10^{-3}$, as illustrated in FIG. 12.

[Mathematical Formula 12]

$$BER = \frac{1}{2}\text{erfc}\left(\sqrt{\frac{CNR}{2}}\right) \quad (12)$$

Referring back to FIG. 11, the full duplex communication can be performed without using the interference canceller when the transmitted power equals −22 dBm or higher, with which the SINR equals 10 dB or higher.

Figure 13:
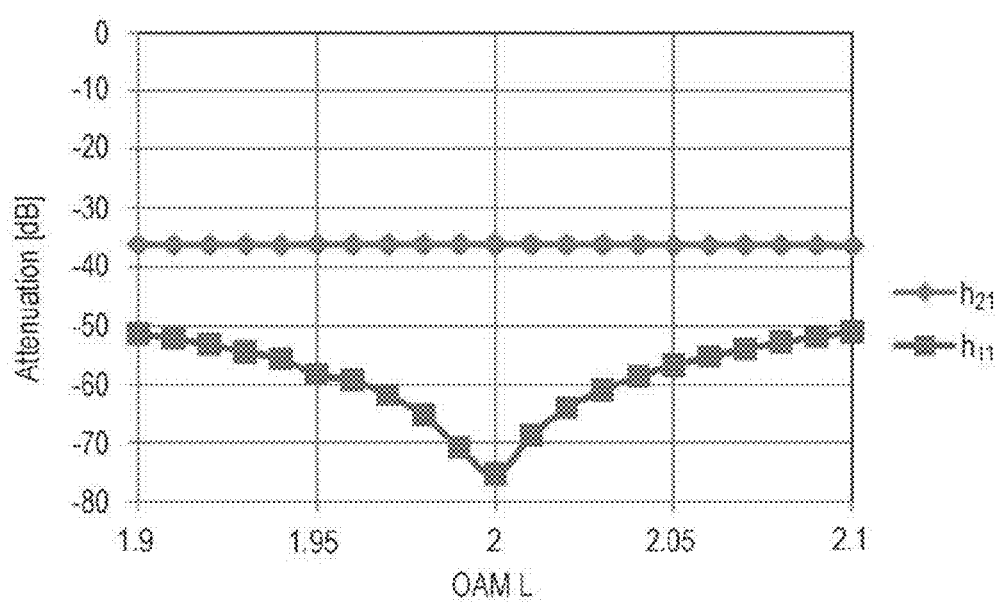
FIG. 13 is a graph illustrating a result of simulating a change in $h_{11}$ and $h_{21}$ when an excitation phase determining the OAM state has an error in the fourth example.

FIG. 13 is a graph illustrating a result of simulating a change in $h_{11}$ and $h_{21}$ when the excitation phase determining the OAM state has an error. The present example has illustrated that the full duplex communication can be performed while assuming $h_{11}$ equals −60 dB or lower. As illustrated in FIG. 13, one can see that there is a large change in $h_{11}$ immediately when the OAM state deviates from L=2 by the error of the excitation phase. The value of L with which $h_{11}$ equals −60 dB or lower falls within the range of 2±0.03.

Fifth Example

Figure 14:
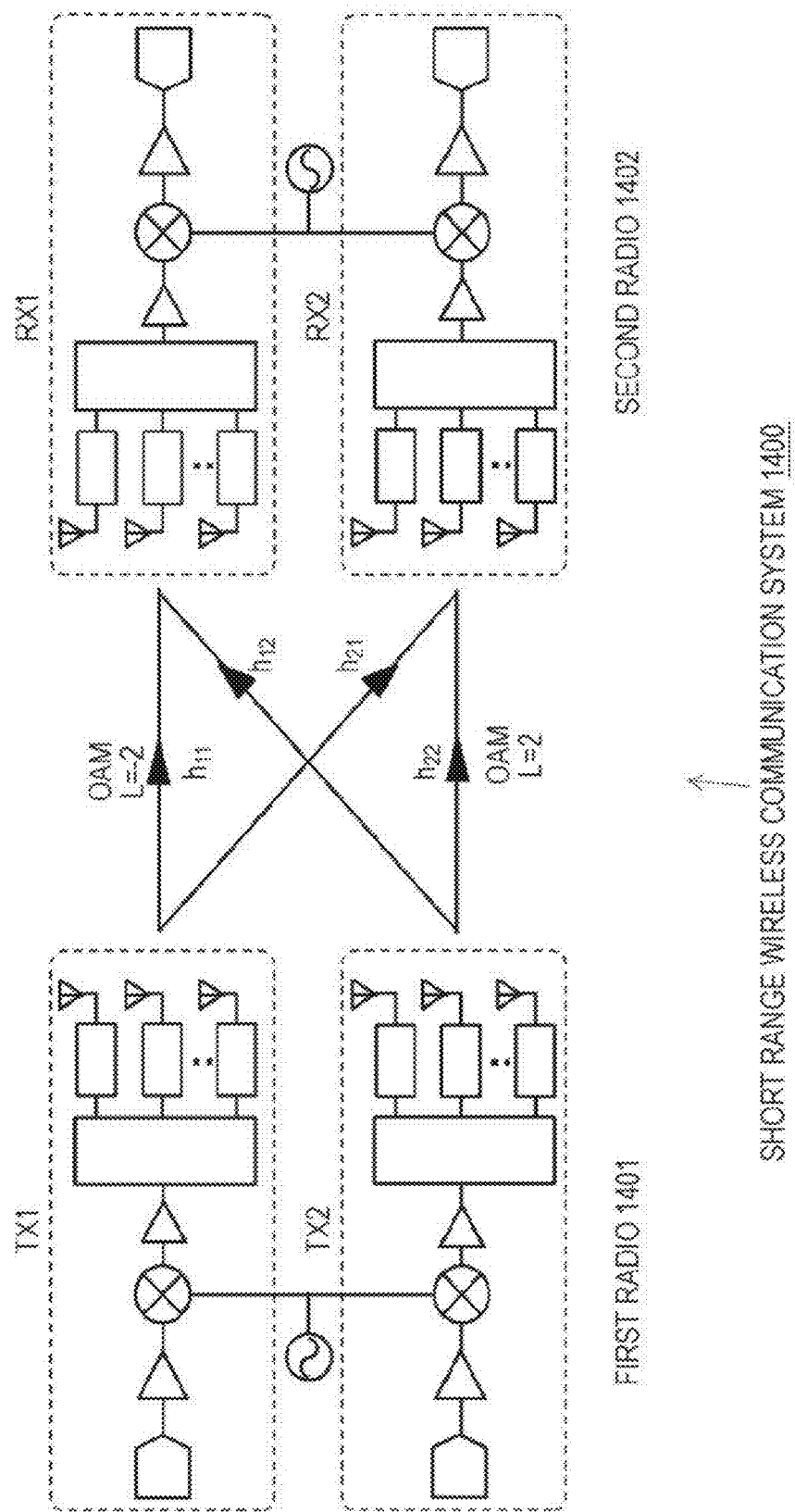
FIG. 14 is a diagram illustrating a configuration example (a fifth example) of a short range wireless communication system 1400 using the whirl of waves.

FIG. 14 illustrates a configuration example (a fifth example) of a short range wireless communication system 1400 using the whirl of waves. The short range wireless communication system 1400 illustrated in the figure is formed of a first radio 1401 and a second radio 1402. The first radio 1401 includes a plurality of (two in the example illustrated in the figure) transmission branches TX1 and TX2. Moreover, the second radio 1402 includes a plurality of (two in the example illustrated in the figure) reception branches RX1 and RX2. In addition, the first radio 1401 and the second radio 1402 then perform multiple input multiple output (MIMO) multiplex communication by the short range wireless communication using the whirl of waves.

In general, a transceiver performing the MIMO multiplex communication is required to know channel state information in advance. On the other hand, spatial/orthogonally polarized MIMO using a polarized antenna orthogonal to a transmission/reception antenna does not require the channel state information.

The present example illustrates that multiplex communication employing the spatial/orthogonally polarized MIMO can be performed by using the fact that the whirls of waves indifferent OAM states have the property of orthogonally intersecting each other (as described above). Specifically, from the side of the first radio 1401, TX1 transmits the whirl of waves in an OAM state L=−2 while TX2 transmits the whirl of waves in an OAM state L=2. Moreover, on the side of the second radio 1402, RX1 receives the whirl of waves from TX1 while RX2 receives the whirl of waves from TX1.

It is now assumed that $h_{11}$ is a propagation characteristic of a path along which the whirl of waves in the OAM state L=−2 transmitted from TX1 reaches RX1 while $h_{22}$ is a propagation characteristic of a path along which the whirl of waves in the OAM state L=2 transmitted from TX2 reaches RX2.

It is further assumed that $h_{21}$ is a propagation characteristic of a path along which the whirl of waves in the OAM state L=−2 transmitted from TX1 reaches RX2 while $h_{12}$ is a propagation characteristic of a path along which the whirl of waves in the OAM state L=2 transmitted from TX2 reaches RX1.

On the side of the first radio 1401, TX1 is assigned the inner circular array antenna while TX2 is assigned the outer circular array antenna, the inner and outer circular array antennas being disposed on the concentric circles as illustrated in FIG. 9. Moreover, on the side of the second radio 1402, RX2 is assigned the inner circular array antenna while RX1 is assigned the outer circular array antenna so that the propagation characteristics $h_{11}$ and $h_{22}$ can be equal.

The propagation characteristic $h_{11}$ between TX1 and RX1 as well as the propagation characteristic $h_{22}$ between TX2 and RX2 change from −20 dB to −50 dB with the change in the distance from 3λ to 20λ as illustrated in FIG. 4 and Table 1. On the other hand, the characteristics $h_{12}$ and $h_{21}$ being the propagation of the orthogonal whirls of waves change under the influence of precision of manufacturing and the excitation phase of the antennas.

Figure 15:
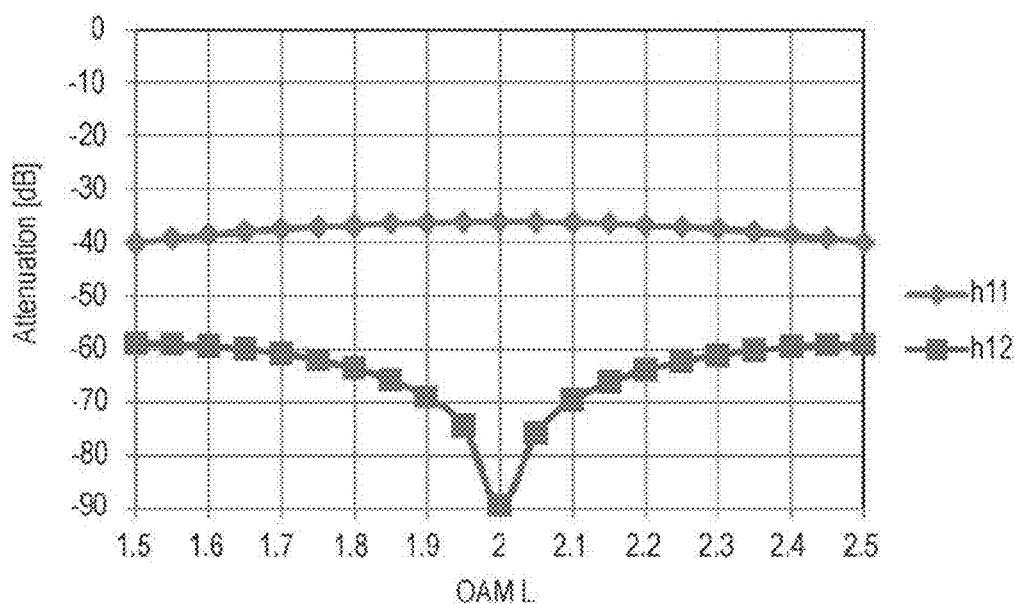
FIG. 15 is a graph illustrating a result of simulating a change in $h_{12}$ and $h_{21}$ when the excitation phase determining the OAM state has an error in the fifth example.

FIG. 15 illustrates a result of simulating the change in $h_{12}$ and $h_{21}$ when the excitation phase determining the OAM state has an error. One can see that there is a large change in $h_{12}$ immediately when the OAM state deviates from L=2 by the error of the excitation phase. As a guideline of performing the multiplex communication with the spatial/orthogonally polarized MIMO, L=2±0.4 is the range of error of the OAM state with which the difference between $h_{11}$ and $h_{12}$ equals 20 dB or larger.

Sixth Example

Figure 16:
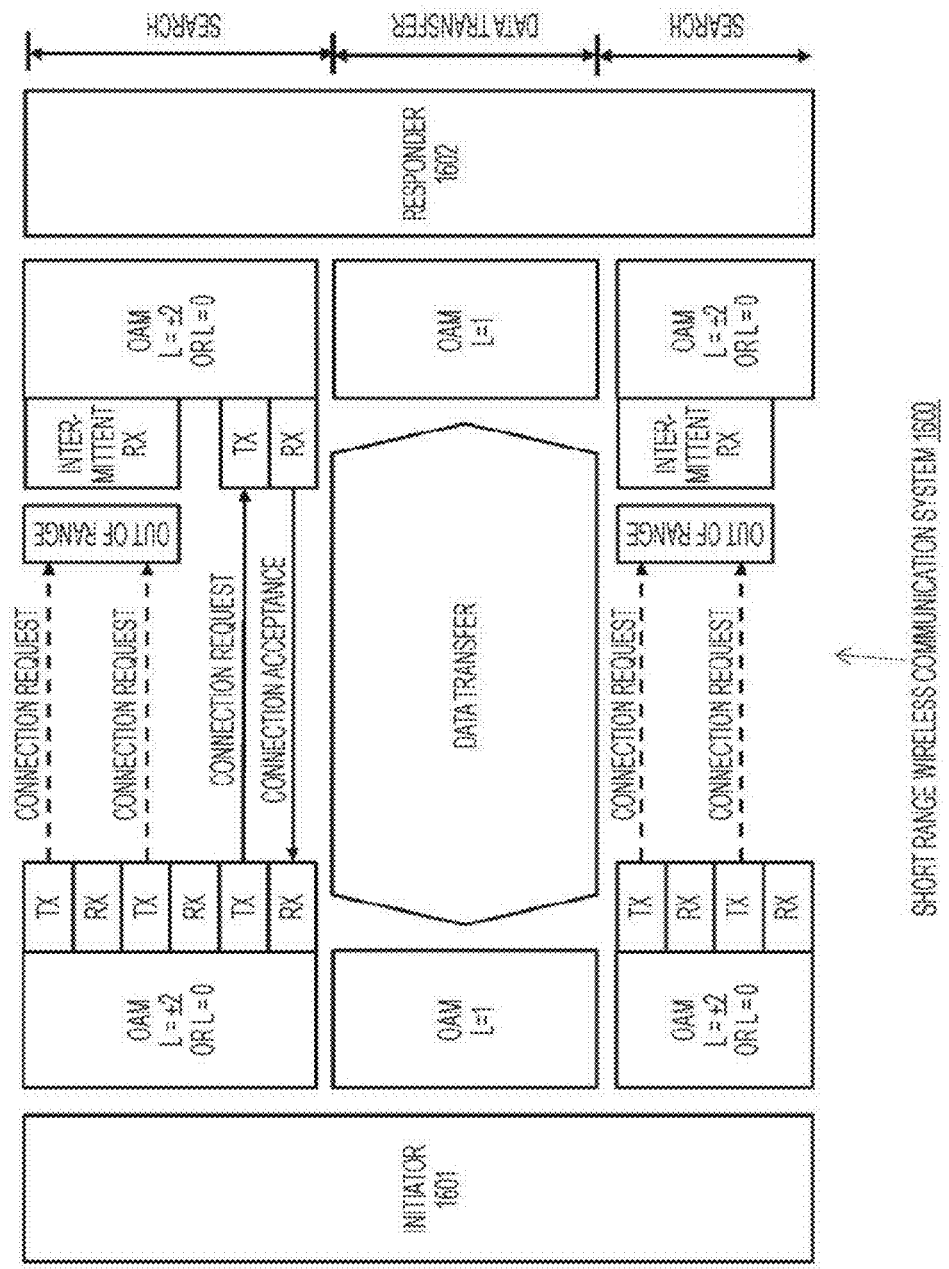
FIG. 16 is a diagram illustrating a configuration example (a sixth example) of a short range wireless communication system 1600 using the whirl of waves.

FIG. 16 illustrates a configuration example (a sixth example) of a short range wireless communication system 1600 using the whirl of waves. The short range wireless communication system 1600 illustrated in the figure includes an initiator 1601 and a responder 1602 that perform short range wireless communication by using the whirl of waves. It is assumed that each of the initiator 1601 and the responder 1602 is formed of any of the short range wireless communication devices illustrated in FIGS. 5, 7, and 8.

The initiator 1601 uses the whirl of waves characteristically attenuating in proportion to the fourth power of the distance (i.e., sets the OAM state to L=±2 or L=0) to make a connection request on a regular basis and wait for a response.

On the other hand, the responder 1602 uses the whirl of waves characteristically attenuating in proportion to the fourth power of the distance (i.e., sets the OAM state to L=±2 or L=0) to perform reception intermittently and be on standby for the whirl of waves transmitted from the initiator 1601 (or search for the initiator 1601). The responder 1602 may instead perform reception at all times to be on standby for the whirl of waves. Then, upon receiving the whirl of waves from the initiator 1601 and detecting the approach thereof, the responder 1602 responds by sending a connection acceptance and establishes a connection with the initiator 1601.

After establishing the connection, both the initiator 1601 and the responder 1602 switch the waves to the whirl of waves characteristically attenuating in proportion to the square of the distance (i.e., set the OAM state to L=±1) and perform data transmission. Then, after completing the data transmission, the initiator 1601 and the responder 1602 switch the waves back to the whirl of waves characteristically attenuating in proportion to the fourth power of the distance (i.e., set the OAM state back to L=±2 or L=0) and return to the standby state.

The operation of each of the initiator 1601 and the responder 1602 described above can be implemented by media access control (MAC), for example.

CITATION LIST

Patent Document

Patent Document 1: Japanese Patent No. 4345849
Patent Document 2: Japanese Patent No. 4788562
Patent Document 3: Japanese Patent Application Laid-Open No. 2012-169779
Patent Document 4: Japanese Patent Application Laid-Open No. S53-8546
Patent Document 5: Japanese Patent Application Laid-Open No. S60-206207

Non-Patent Document

Non-Patent Document 1:
Q. Bai, A. Tennant, B. Allen, M. U. Rehman, "Generation of Orbital Angular Momentum (OAM) Radio Beams with Phased Patch Array," (Antennas and Propagation Conference (LAPC 2013), Loughborough, pp. 410-413, November 2013)
Non-Patent Document 2:
S. M. Mohammadi, L. K. S. Daldorff, J. E. S. Bergman, R. L. Karlsson, B. Thide, K. Forozesh, T. D. Carizzi, B. Isham, "Orbital angular momentum in a radio—A system study," (IEEE Trans. Antennas Propag., vol. 58, no. 2, pp. 565-572, Feb. 2010)

INDUSTRIAL APPLICABILITY

The technology disclosed in the present description has been described in detail with reference to the specific embodiments. However, it is apparent that those skilled in the art can make a modification and/or a substitution to/for the embodiments without departing from the gist of the technology disclosed in the present description.

While the present description has primarily described the embodiments applied to the system that performs short range wireless communication by mainly using the millimeter wave, the gist of the technology disclosed in the present description is not limited to what has been described. The technology disclosed in the present description can also be applied to various types of wireless communication systems transmitting and receiving the whirl of waves.

In short, the present technology disclosed in the present description has been described by way of illustration, and what has been described in the present description is not to be interpreted in a limited manner. One should refer to claims in order to assess the gist of the technology disclosed in the present description.

Note that the technology disclosed in the present description can take the following configuration as well.

(1) A wireless communication device including:
an antenna unit that transmits and receives a whirl of waves; and
a setting unit that sets a state of the whirl of waves transmitted and received by the antenna unit.

(2) The wireless communication device according to (1) above, where
the setting unit sets the antenna unit to a state in which the whirl of waves characteristically attenuates in proportion to a (2+K)-th power of a distance (where K>0).

(3) The wireless communication device according to either (1) or (2) above, where
the antenna unit is formed of a circular array antenna in which each of a plurality of antenna elements is disposed at a regular interval along a circumference of a circle while facing a center of the circle, and
the wireless communication device further includes a divider/combiner that divides a transmitted signal among the plurality of the antenna elements or combines a received signal of the plurality of the antenna elements.

(4) The wireless communication device according to (3) above, where
the setting unit includes a phase shifter that shifts a phase of the transmitted signal or the received signal of the plurality of the antenna elements according to an angle at which each antenna element is disposed.

(5) The wireless communication device according to any one of (1) to (4) above, where
the antenna unit includes a circular array antenna in which each of N antenna elements is disposed at a regular interval along a circumference of a circle while facing a center of the circle, and
the setting unit shifts a phase of a transmitted signal from an n-th antenna element by an excitation phase $\Phi_n$ expressed in expression (13) to allow the antenna unit to transmit a whirl of waves in a desired OAM state L at the time of transmission or, at the time of reception, shifts a phase of a received signal of the n-th antenna element by the phase $\Phi_n$ expressed in expression (13) to allow the antenna unit to receive a whirl of waves in a desired OAM state L.

[Mathematical Formula 13]

$$\Phi_n = \frac{2\pi L(n-1)}{N} \quad (13)$$

(6) The wireless communication device according to (3) above, where
the divider/combiner divides the transmitted signal among the plurality of the antenna elements equally in phase or combines the received signal of the plurality of the antenna elements equally in phase.

(7) The wireless communication device according to any one of (1) to (3) above, where
the antenna unit includes a first circular array antenna in which each of a plurality of antenna elements for transmission is disposed at a regular interval along a circumference of a circle while facing a center of the circle, and a second circular array antenna in which each of a plurality of antenna elements for reception is disposed at a regular interval along a circumference of a circle while facing a center of the circle, the first and second circular array antennas being provided separately.

(8) The wireless communication device according to (7) above, where
the first circular array antenna and the second circular array antenna are disposed on the circumferences of concentric circles.

(9) The wireless communication device according to (7) or (8) above, where
the first circular array antenna is disposed on an inner side of the second circular array antenna.

(10) The wireless communication device according to any one of (3) to (9) above, where
each of the plurality of the antenna elements is formed of a linearly polarized patch antenna.

(11) The wireless communication device according to any one of (3) to (9) above, where
each of the plurality of the antenna elements is configured to transmit and receive a signal of a millimeter wave band.

(12) The wireless communication device according to (1) above, where
the antenna unit includes a transmission antenna and a reception antenna separately, and
performs transmission by using the whirl of waves in a first state as well as receives the whirl of waves in a second state different from the first state.

(13) A wireless communication device including
a plurality of communication branches each having an antenna unit that transmits and receives a whirl of waves, where
the wireless communication device performs transmission and reception by using the whirl of waves in a state different for each communication branch.

(14) The wireless communication device according to (1) above, where
the setting unit sets the antenna unit to a state in which the whirl of waves characteristically attenuates in proportion to a (2+K)-th power of a distance at the time of searching for a device (where K>0) and, after a connection is established, sets the antenna unit to a state in which the whirl of waves characteristically attenuates in proportion to a square of the distance.

(15) A wireless communication system including a first radio and a second radio each transmitting and receiving a whirl of waves, where the system performs transmission from the first radio to the second radio by using the whirl of waves in a first state and performs transmission from the second radio to the first radio by using the whirl of waves in a second state different from the first state.

(16) A wireless communication system including:
a transmitter that includes a plurality of transmission branches each having an antenna unit transmitting a whirl of waves and transmits the whirl of waves in a state different for each transmission branch; and
a receiver that includes a plurality of reception branches each having an antenna unit receiving the whirl of waves and receives the whirl of waves in a state different for each reception branch.

(17) A wireless communication system including an initiator and a responder each transmitting and receiving a whirl of waves, where the initiator transmits a connection request on a regular basis by using the whirl of waves characteristically attenuating in proportion to a (2+K)-th power of a distance and waits for a response from the responder (where K>0), the responder performs reception intermittently to be on standby for the whirl of waves from the initiator and responds by sending a connection acceptance upon detecting an approach of the initiator, and, after a connection is established, the initiator and the responder perform data communication by switching an antenna unit to a state in which the whirl of waves characteristically attenuates in proportion to a square of the distance.

REFERENCE SIGNS LIST

200 Circular array antenna
201 to 208 Linearly polarized patch antenna
500 Short range wireless communication device (first example)
501 Circular array antenna
502 Transmission amplifier
503 Reception amplifier
504 Transmission phase shifter
505 Reception phase shifter
506 Divider/combiner
507 Digital-to-analog converter (DAC)
508 Power amplifier
509 Up converter
510 Oscillator
511 Down converter
512 Low-noise amplifier
513 Analog-to-digital converter (ADC)
600 Short range wireless communication device (second example)
601 Circular array antenna
603 Divider/combiner
604 Digital-to-analog converter (DAC)
605 Power amplifier
606 Up converter
607 Transmission amplifier
608 Oscillator
609 Reception amplifier
610 Down converter
611 Low-noise amplifier
612 Analog-to-digital converter (ADC)
700 Short range wireless communication device (third example)
701 Circular array antenna (for transmission)
702 Transmission amplifier
703 Transmission phase shifter
704 Divider
705 Up converter
706 Power amplifier
707 Digital-to-analog converter (DAC)
708 Oscillator
711 Circular array antenna (for reception)
712 Reception amplifier
713 Reception phase shifter
714 Combiner
715 Down converter
716 Low-noise amplifier
717 Analog-to-digital converter (ADC)
800 Short range wireless communication device (variation of third example)
801 Circular array antenna (for transmission)
802 Transmission amplifier
803 Transmission phase shifter
804 Divider
805 Up converter
806 Power amplifier
807 Digital-to-analog converter (DAC)
808 Oscillator
811 Circular array antenna (for reception)
812 Reception amplifier
813 Reception phase shifter
814 Combiner
815 Down converter
816 Low-noise amplifier
817 Analog-to-digital converter (ADC)
1000 Short range wireless communication system (fourth example)
1001 First radio
1002 Second radio
1400 Short range wireless communication system (fifth example)
1401 First radio
1402 Second radio
1600 Short range wireless communication system (sixth example)
1601 Initiator
1602 Responder

The invention claimed is:

1. A wireless communication system comprising:
a first radio including
a first circular array antenna including a plurality of transmission polarized patch antennas, the first circular array antenna being configured to transmit a first whirl of waves in a first orbital angular momentum (OAM) state, and
a second circular array antenna including a plurality of reception polarized patch antennas provided separately from the first circular array antenna, the second circular array antenna being configured to receive a second whirl of waves in a second OAM state, the second whirl of waves in the second OAM state being orthogonal to the first whirl of waves in the first OAM state; and
a second radio including
a third circular array antenna including a plurality of transmission polarized patch antennas, the third circular array antenna being configured to transmit the second whirl of waves to the first radio in the second OAM state, and
a fourth circular array antenna including a plurality of reception polarized patch antennas provided separately from the third circular array antenna, the fourth circular array antenna being configured to receive the first whirl of waves in the first OAM state,
wherein the first circular array antenna of the first radio transmits the first whirl of waves in the first OAM state to the fourth circular array antenna of the second radio,
wherein the first whirl of waves received by the fourth circular array antenna of the second radio reaches the third circular array antenna of the second radio via coupling between the third circular array antenna of the second radio and the fourth circular array antenna of the second radio, and
wherein the third circular array antenna of the second radio transmits the second whirl of waves in the second OAM state to the second circular array antenna of the first radio.

2. The wireless communication system according to claim 1, wherein the first and second whirl of waves characteristically attenuate in proportion to a (2+K)-th power of a distance (where K>0).

3. The wireless communication system according to claim 1, wherein each of the plurality of transmission polarized patch antennas and the plurality of reception polarized patch antennas are disposed at a regular interval along a circumference of a circle while facing a center of the circle, and the first radio further includes a divider/combiner that divides a transmitted signal among the plurality of transmission polarized patch antennas of the first radio or combines a received signal of the plurality of the reception polarized patch antennas of the first radio.

4. The wireless communication system according to claim 3, wherein the first radio includes a phase shifter that shifts a phase of the transmitted signal of the plurality of transmission polarized patch antennas of the first radio according to an angle at which each of the plurality of transmission polarized patch antennas is disposed or the received signal of the plurality of the reception polarized patch antennas of the first radio according to an angle at which each of the plurality of reception polarized patch antennas is disposed.

5. The wireless communication system according to claim 4, wherein the first circular array antenna includes N of the transmission polarized patch antennas disposed at a regular interval along a circumference of a first circle while facing a center of the first circle, the second circuitry array antenna includes N of the reception polarized patch antennas disposed at a regular interval along a circumference of a second circle while facing a center of the second circle, and the first radio is configured to shift a phase of the transmitted signal from an n-th one of the transmission polarized patch antennas by an excitation phase $\Phi_n$ expressed in expression (1) to allow the first circular array antenna to transmit the first whirl of waves in a desired OAM state L at the time of transmission or, at the time of reception, shifts a phase of a received signal of the n-th one of the reception polarized patch antennas by the phase $\Phi_n$ expressed in expression (1) to allow the second circular array antenna to receive the second whirl of waves in a desired OAM state L.

[Mathematical Formula 1]

$$\Phi_n = \frac{2\pi L(n-1)}{N}. \quad (1)$$

6. The wireless communication system according to claim 3, wherein the divider/combiner divides the transmitted signal among the plurality of the transmission polarized patch antennas of the first radio equally in phase or combines the received signal of the plurality of the reception polarized patch antennas of the first radio equally in phase.

7. The wireless communication system according to claim 3, wherein the first circular array antenna includes the plurality of transmission polarized patch antennas of the first radio for transmission disposed at a regular interval along a circumference of a circle while facing a center of the circle, and the second circular array antenna includes the plurality of reception polarized patch antennas of the first radio for reception disposed at a regular interval along a circumference of a circle while facing a center of the circle, the first and second circular array antennas being provided separately.

8. The wireless communication system according to claim 7, wherein the first circular array antenna and the second circular array antenna are disposed on the circumferences of concentric circles.

9. The wireless communication system according to claim 7, wherein the first circular array antenna is disposed on an inner side of the second circular array antenna.

10. The wireless communication system according to claim 3, wherein each of the plurality of the transmission polarized patch antennas and reception polarized patch antennas is formed of a linearly polarized patch antenna.

11. The wireless communication system according to claim 3, wherein each of the plurality of the transmission polarized patch antennas of the first radio is configured to transmit a first signal of a millimeter wave band, and the reception polarized patch antennas of the first radio is configured to receive a second signal of the millimeter wave band.

12. The wireless communication system according to claim 1, wherein the first and third circular array antennas are configured to be set to a state in which the first and second whirl of waves characteristically attenuate in proportion to a (2+K)-th power of a distance at the time of searching for a device (where K>0) and, after a connection is established, each of the first and third circular array antennas is set to a state in which the first and second whirl of waves characteristically attenuate in proportion to a square of the distance.

13. A wireless communication system comprising:
a transmitter that includes a plurality of transmission branches, wherein each transmission branch includes
a first circular array antenna including a plurality of transmission polarized patch antennas, the first circular array antenna being configured to transmit a first whirl of waves in a first orbital angular momentum (OAM) state, wherein the first whirl of waves is in a state different for each transmission branch; and
a receiver that includes a plurality of reception branches, wherein each reception branch includes
a second circular array antenna including a plurality of reception polarized patch antennas provided separately from the first circular array antenna, the second circular array antenna being configured to receive a second whirl of waves in a second OAM state, the second whirl of waves in the second OAM state being orthogonal to the first whirl of waves in the first OAM state, wherein the second whirl of waves in a state different for each reception branch,
wherein the first circular array antenna of the transmitter transmits the first whirl of waves in the first OAM state,
wherein the second whirl of waves received by the second circular array antenna of the receiver reaches the first circular array antenna of the transmitter via coupling between the first circular array antenna of the transmitter and the second circular array antenna of the receiver,
wherein the second circular array antenna of the receiver receives the second whirl of waves in the second OAM state.

14. A wireless communication system comprising
an initiator including
a first circular array antenna including a plurality of transmission polarized patch antennas, the first circular array antenna being configured to transmit a first whirl of waves in a first orbital angular momentum (OAM) state, and
a second circular array antenna including a plurality of reception polarized patch antennas provided separately from the first circular array antenna, the second circular array antenna being configured to receive a second whirl of waves in a second OAM state, the second whirl of waves in the second OAM state being orthogonal to the first whirl of waves in the first OAM state; and a responder including
- a third circular array antenna including a plurality of transmission polarized patch antennas, the third circular array antenna being configured to transmit the second whirl of waves to the first radio in the second OAM state, and
- a fourth circular array antenna including a plurality of reception polarized patch antennas provided separately from the third circular array antenna, the fourth circular array antenna being configured to receive the first whirl of waves in the first OAM state, wherein the initiator transmits a connection request on a regular basis by using the first whirl of waves characteristically attenuating in proportion to a (2+K)-th power of a distance and waits for a response from the responder (where K>O), the responder performs reception intermittently to be on standby for the first whirl of waves from the initiator and responds by sending a connection acceptance upon detecting an approach of the initiator, and, after a connection is established, the initiator and the responder perform data communication by switching one or more of the first or second circular array antenna to a state in which the first or second whirl of waves characteristically attenuate in proportion to a square of the distance.

\* \* \* \* \*